(12) United States Patent
Speasl et al.

(10) Patent No.: US 11,373,539 B2
(45) Date of Patent: Jun. 28, 2022

(54) UNMANNED AERIAL VEHICLE MANAGEMENT

(71) Applicant: ImageKeeper LLC, Las Vegas, NV (US)

(72) Inventors: Jerry Speasl, Las Vegas, NV (US); Mike Patterson, Sherman, TX (US); Marc Roberts, St. Louis, MO (US)

(73) Assignee: ImageKeeper LLC, Las Vegas, NV (US)

( * ) Notice: Subject to any disclaimer, the term of this patent is extended or adjusted under 35 U.S.C. 154(b) by 189 days.

(21) Appl. No.: 16/817,498

(22) Filed: Mar. 12, 2020

(65) Prior Publication Data

US 2020/0349853 A1 Nov. 5, 2020

Related U.S. Application Data

(63) Continuation of application No. 16/660,237, filed on Oct. 22, 2019, now Pat. No. 11,308,815, which is a
(Continued)

(51) Int. Cl.
*G08G 5/00* (2006.01)
*B64C 39/02* (2006.01)
(Continued)

(52) U.S. Cl.
CPC ......... *G08G 5/0034* (2013.01); *B64C 39/024* (2013.01); *B64F 1/222* (2013.01);
(Continued)

(58) Field of Classification Search
CPC .. G08G 5/0034; G08G 5/0069; G08G 5/0082; G08G 5/0091; B64C 39/0024;
(Continued)

(56) References Cited

U.S. PATENT DOCUMENTS

| 4,123,020 A | 10/1978 | Korsak |
| 5,326,028 A | 7/1994 | Kano et al. |

(Continued)

FOREIGN PATENT DOCUMENTS

| WO | WO 2016/015301 | 2/2016 |
| WO | WO 2016/205415 | 12/2016 |

OTHER PUBLICATIONS

U.S. Appl. No. 16/660,237 Office Action dated Aug. 19, 2021.
(Continued)

*Primary Examiner* — Yazan A Soofi
(74) *Attorney, Agent, or Firm* — Polsinelli LLP

(57) ABSTRACT

A base module may be used to receive and house one or more unmanned aerial vehicles (UAVs) via one or more cavities. The base module receives commands from a manager device and identifies a flight plan that allows a UAV to execute the received commands. The base module transfers the flight plan to the UAV and frees the UAV. Once the UAV returns, the base module once again receives it. The base module then receives sensor data from the UAV from one or more sensors onboard the UAV, and optionally receives additional information describing its flight and identifying success or failure of the flight plan. The base module transmits the sensor data and optionally the additional information to a storage medium locally or remotely accessible by the manager device.

24 Claims, 19 Drawing Sheets

Related U.S. Application Data continuation of application No. 15/183,653, filed on Jun. 15, 2016, now Pat. No. 10,453,348.

(60) Provisional application No. 62/175,561, filed on Jun. 15, 2015.

(51) Int. Cl.
*B64F 1/22* (2006.01)
*G06Q 10/08* (2012.01)

(52) U.S. Cl.
CPC .......... *G06Q 10/08* (2013.01); *G08G 5/0069* (2013.01); *G08G 5/0082* (2013.01); *B64C 2201/042* (2013.01); *B64C 2201/066* (2013.01); *B64C 2201/121* (2013.01); *B64C 2201/126* (2013.01); *B64C 2201/145* (2013.01); *B64C 2201/20* (2013.01); *G08G 5/0091* (2013.01)

(58) Field of Classification Search
CPC ........ B64C 2201/042; B64C 2201/066; B64C 2201/121; B64C 2201/126; B64C 2201/145; G06Q 10/08
USPC .......................................................... 701/3
See application file for complete search history.

(56) References Cited

U.S. PATENT DOCUMENTS

| | | | |
|---|---|---|---|
| 6,901,971 B2 | 6/2005 | Speasl et al. | |
| 8,511,606 B1 | 8/2013 | Lutke et al. | |
| 8,899,903 B1 | 12/2014 | Saad et al. | |
| 9,139,310 B1 | 9/2015 | Wang | |
| 9,280,038 B1 | 3/2016 | Pan et al. | |
| 9,284,062 B2 | 3/2016 | Wang | |
| 9,387,928 B1 | 7/2016 | Gentry et al. | |
| 9,434,267 B2 | 9/2016 | Wang et al. | |
| 9,646,502 B1 | 5/2017 | Gentry | |
| 9,650,133 B2 | 5/2017 | Fisher et al. | |
| 9,718,564 B1 | 8/2017 | Beckman et al. | |
| 9,783,075 B2 | 10/2017 | Henry et al. | |
| 9,817,396 B1 | 11/2017 | Takayama et al. | |
| 10,453,348 B2 | 10/2019 | Speasl et al. | |
| 11,222,299 B1 | 1/2022 | Baalke et al. | |
| 2006/0249622 A1* | 11/2006 | Steele | B64F 1/02 244/115 |
| 2009/0299582 A1 | 12/2009 | Anderson | |
| 2012/0080556 A1 | 4/2012 | Root | |
| 2013/0081245 A1 | 4/2013 | Vavrina et al. | |
| 2014/0010619 A1 | 1/2014 | Dor-el et al. | |
| 2014/0032034 A1 | 1/2014 | Raptopoulos et al. | |
| 2014/0129059 A1* | 5/2014 | Scarlatti | B60L 53/80 701/16 |
| 2014/0172194 A1 | 6/2014 | Levien et al. | |
| 2014/0222248 A1 | 8/2014 | Levien et al. | |
| 2015/0120094 A1* | 4/2015 | Kimchi | G01C 21/20 701/3 |
| 2016/0011592 A1* | 1/2016 | Zhang | G05D 1/102 701/2 |
| 2016/0039300 A1 | 2/2016 | Wang et al. | |
| 2016/0144734 A1 | 5/2016 | Wang | |
| 2016/0266578 A1 | 9/2016 | Douglas et al. | |
| 2016/0364989 A1 | 12/2016 | Speasl | |
| 2017/0021942 A1 | 1/2017 | Fisher et al. | |
| 2017/0023949 A1 | 1/2017 | Fisher et al. | |
| 2017/0069214 A1 | 3/2017 | Dupray et al. | |
| 2017/0081043 A1 | 3/2017 | Jones et al. | |
| 2017/0081045 A1* | 3/2017 | Byers | A47G 29/14 |
| 2017/0110017 A1 | 4/2017 | Kimchi et al. | |
| 2017/0113815 A1 | 4/2017 | James et al. | |
| 2017/0115667 A1 | 4/2017 | Marr et al. | |
| 2017/0144776 A1 | 5/2017 | Fisher et al. | |
| 2017/0175413 A1 | 6/2017 | Curlander et al. | |
| 2017/0177006 A1 | 6/2017 | Fisher et al. | |
| 2017/0183106 A1 | 6/2017 | Yu et al. | |
| 2017/0190443 A1 | 7/2017 | Fisher et al. | |
| 2017/0190510 A1 | 7/2017 | Porat | |
| 2017/0225799 A1* | 8/2017 | Selwyn | D06M 15/705 |
| 2017/0225802 A1 | 8/2017 | Lussier et al. | |
| 2017/0283090 A1 | 10/2017 | Miller et al. | |
| 2017/0349376 A1 | 12/2017 | Porat | |
| 2018/0074518 A1 | 3/2018 | Cantrell et al. | |
| 2018/0079531 A1 | 3/2018 | Bennett et al. | |
| 2018/0198779 A1 | 7/2018 | Canavor et al. | |
| 2019/0265705 A1 | 8/2019 | Zhang et al. | |
| 2019/0377345 A1 | 12/2019 | Bachrach et al. | |
| 2020/0160728 A1 | 5/2020 | Speasl | |
| 2020/0286389 A1 | 9/2020 | Speasl | |
| 2020/0410872 A1 | 12/2020 | Speasl | |
| 2021/0082291 A1 | 3/2021 | Villa et al. | |
| 2021/0347500 A1* | 11/2021 | Hagan | B64C 27/20 |

OTHER PUBLICATIONS

PCT Application No. PCT/US2016/037694 International Preliminary Report on Patentability dated Dec. 19, 2017, 6 pages.
Fujii et al., Katsuya; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing. p. 216-223.
PCT Application No. PCT/US2016/037694 International Search Report and Written Opinion dated Sep. 16, 2016.
U.S. Appl. No. 15/183,653 Final Office Action dated Mar. 27, 2019.
U.S. Appl. No. 15/183,653 Office Action dated Sep. 12, 2018.
U.S. Appl. No. 15/183,653 Final Office Action dated Apr. 19, 2018.
U.S. Appl. No. 15/183,653 Office Action dated Sep. 19, 2017.
U.S. Appl. No. 16/818,242 Office Action dated Jan. 21, 2022.
U.S. Appl. No. 16/863,310 Office Action dated Feb. 2, 2022.

* cited by examiner

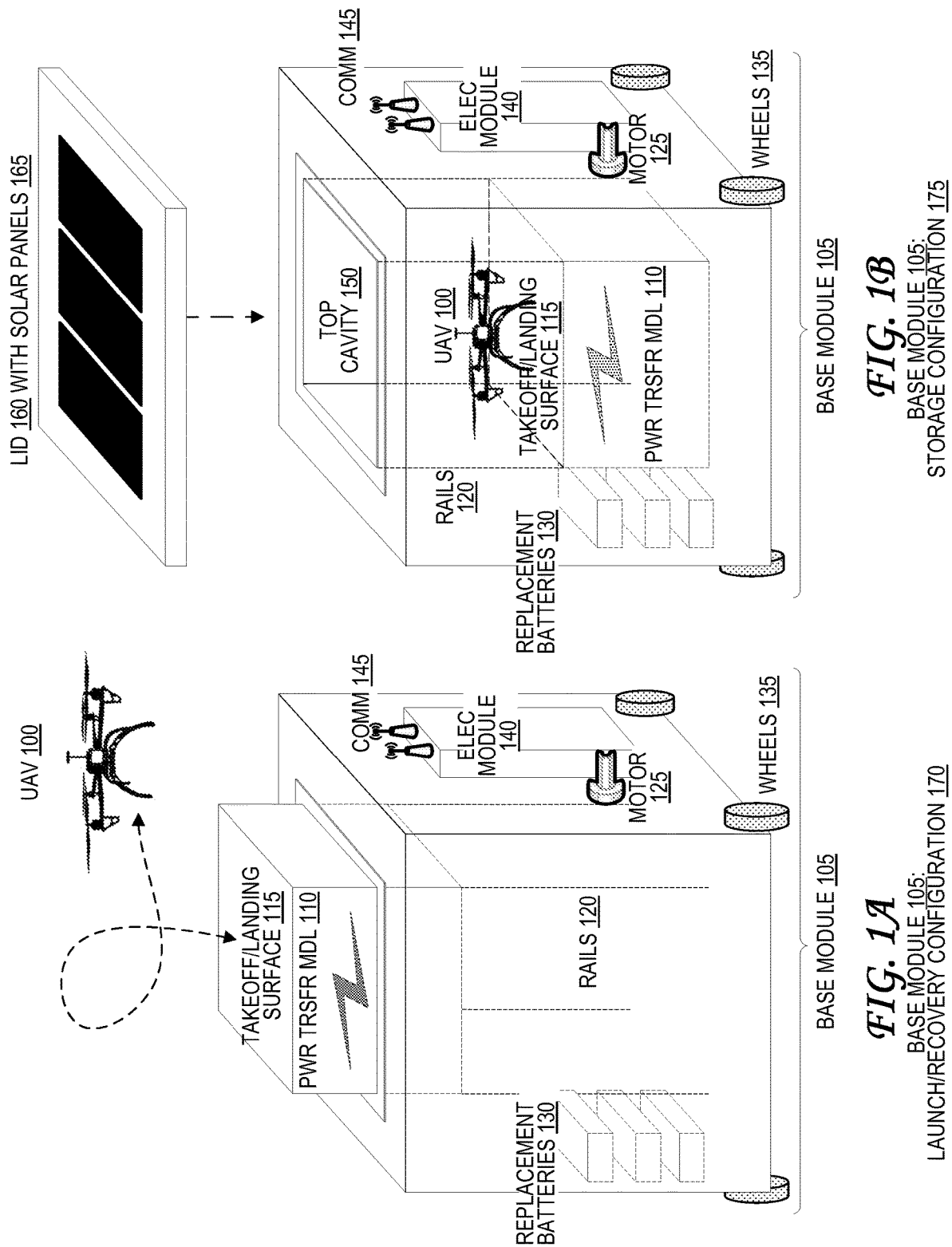

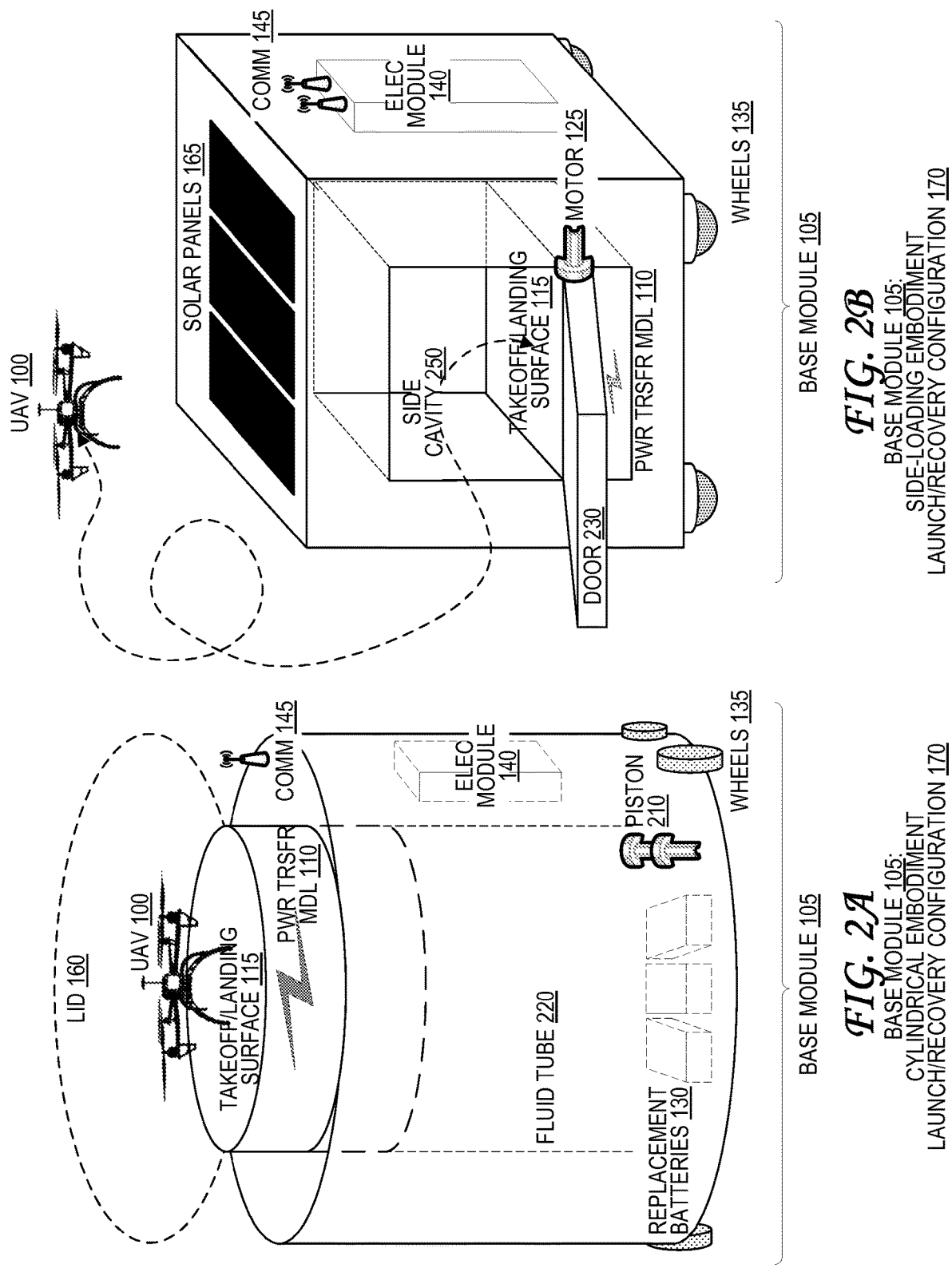

SIDE-LOADING BASE MODULE 105 WITH TREADMILL RUNWAY 215
RECEIVING LANDING WINGED UAV 100

SIDE-LOADING BASE MODULE 105 WITH TREADMILL RUNWAY 215 AND CATAPULT 275
FREEING LAUNCHING WINGED UAV 100

BASE MODULE 105:
STORAGE CONFIGURATION 175
MULTIPLE-UAV-SHUFFLER

BASE MODULE 105:
LAUNCH/RECOVERY CONFIGURATION 170
MULTIPLE-UAV-GRID (TOP-DOWN VIEW)

BASE MODULE 105 IN WATERCRAFT 410:
SINGLE UAV 100
IN LAUNCH/RECOVERY CONFIGURATION 170

BASE MODULE 105 IN TRUCK 405:
MULTIPLE UAVS 100
ONE UAV 100 IN STORAGE CONFIGURATION 175
ONE UAV 100 IN LAUNCH/RECOVERY CONFIGURATION 170

BASE MODULE 105 HIDDEN IN FALSE CHIMNEY 420 OF BUILDING 415: SINGLE UAV 100 IN LAUNCH OR RECOVERY CONFIGURATION

BASE MODULE COUPLED TO "MOTHER" WINGED UAV

BASE MODULE COUPLED TO "MOTHER" VTOL UAV

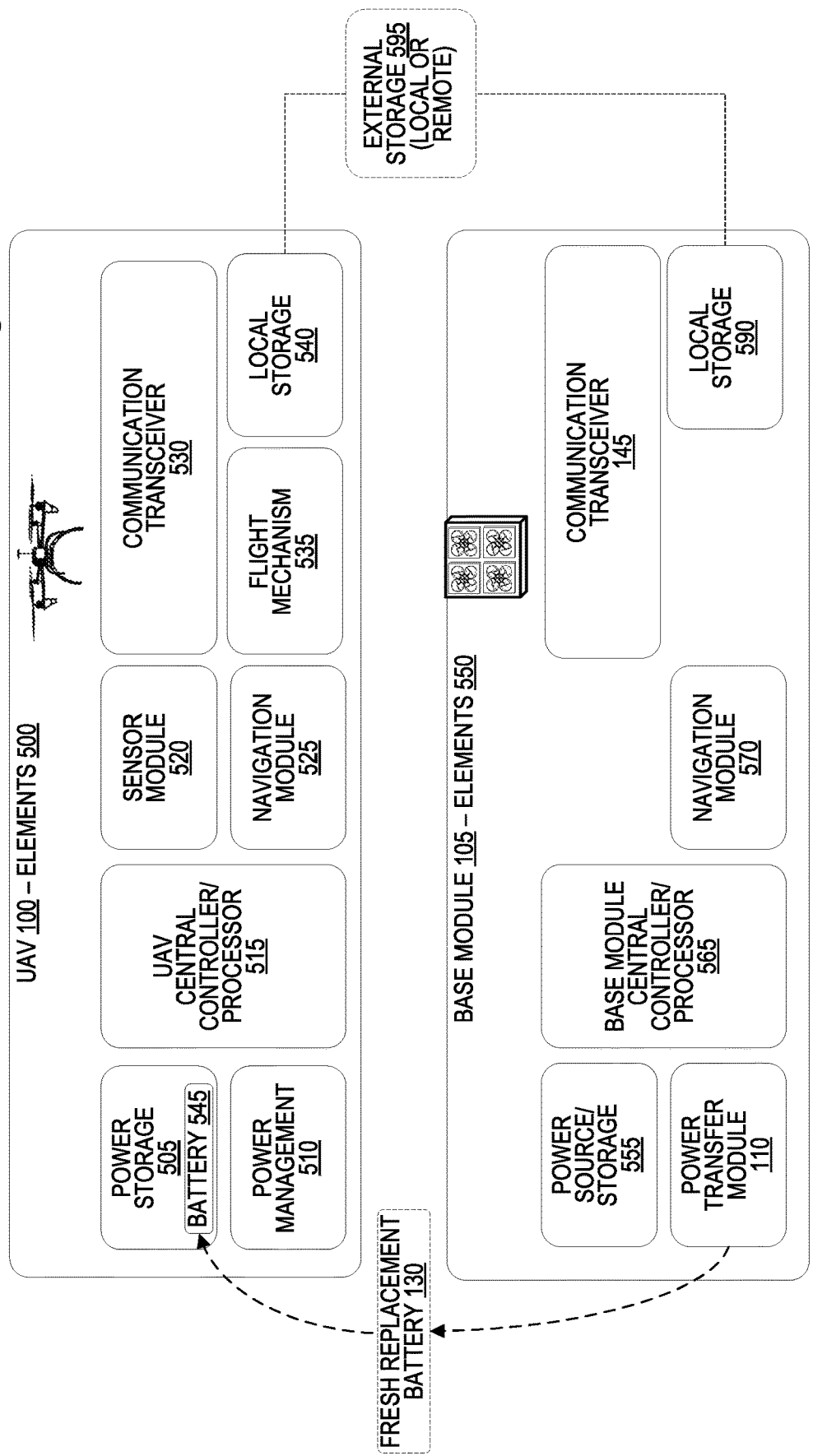

UAV Information 810:

| | |
|---|---|
| Manufacturer: | DroneSys |
| Hardware Model: | V 1.6 |
| Software Version: | V 1.3 |
| Date of Service: | 03/26/16 |
| UAV ID: | 1234567 |
| Registration Number: | 675673 |
| FAA Airworthiness: | 03/17/16 |
| Sensors | Camera, Mic, IR, Radar, Sonar |
| Sensor Certification: | 02/06/16 |
| Flight Logs: | [[ATTACHMENT]] |
| Mission Data: | [[ATTACHMENT]] |
| Maintenance Logs: | [[ATTACHMENT]] |
| Parts List, Manual Data: | [[ATTACHMENT]] |
| Flight Schedule: | on hold |
| Pilots: | John Smith, Jack Flash |
| Squawk List: | [[ATTACHMENT]] |
| Comm Type: | Wi-Fi, Bluetooth |
| Connection Codes: | [[ATTACHMENT]] |
| Transponder code: | 7968652874 |

Current status 820:

| | |
|---|---|
| Location: | Stored at BASE MODULE X in Nevada |
| Damaged: | No |
| Recharged: | Yes |

MISSION LOG 830:

Mission 1:
| | |
|---|---|
| Date: | 08/06/2015 |
| Location: | Wyoming |
| Objective: | elevation mapping of property X |
| Objective status: | completed |
| Data type: | images |
| Sensor data: | [[ATTACHMENT]] |
| Flight plan: | autonomous, generated entirely by UAV |
| Flight Track History: | [[ATTACHMENT]] |

Mission 2:
| | |
|---|---|
| Date: | 08/14/2015 |
| Location: | Iraq |
| Objective: | locate weapon cache |
| Objective status: | failed – entered warzone and returned to base module |
| Data type: | video |
| Sensor data: | [[ATTACHMENT]] |
| Flight plan: | semi-autonomous, checkpoints selected by John Smith |
| Flight Track History: | [[ATTACHMENT]] |

*FIG. 8*

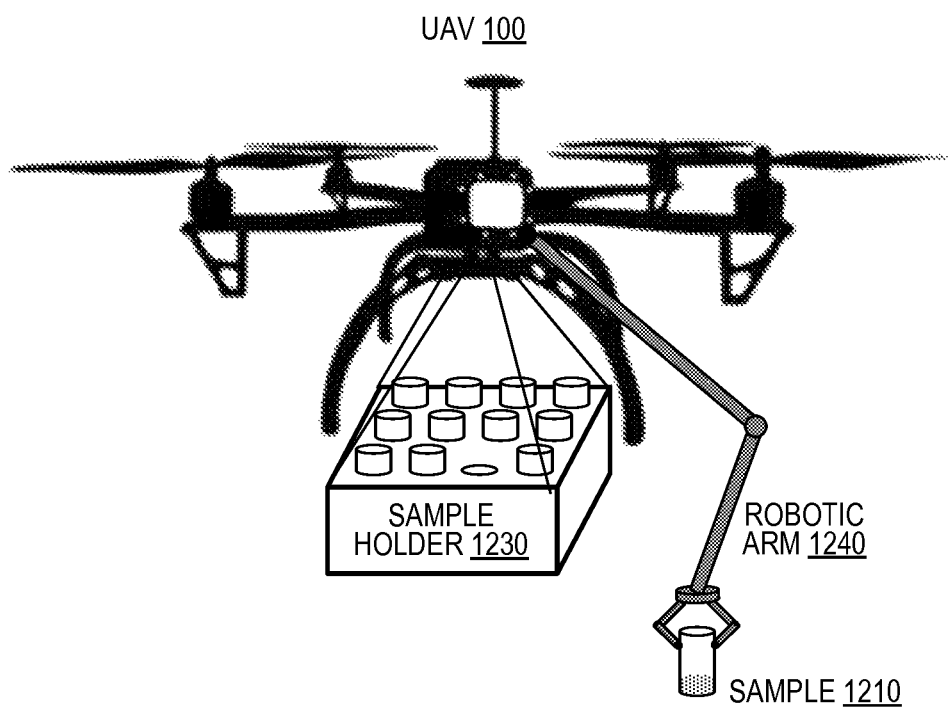
FIG. 12

US 11,373,539 B2

UNMANNED AERIAL VEHICLE MANAGEMENT

CROSS-REFERENCE TO RELATED APPLICATIONS

This application is a continuation and claims the priority benefit of U.S. patent application Ser. No. 16/660,237 filed Oct. 22, 2019, which is a continuation and claims the priority benefit of Ser. No. 15/183,653 filed Jun. 15, 2016, now U.S. Pat. No. 10,453,348, which claims the priority benefit of U.S. Provisional Application No. 62/175,561 filed Jun. 15, 2015 and entitled "Unmanned Aerial Vehicle Management," the disclosures of which are hereby incorporated by reference.

BACKGROUND OF THE INVENTION

1. Field of the Invention

The present invention generally relates to unmanned aerial vehicle (UAV) management. More specifically, the present invention relates to storage, flight planning, and data collection from unmanned aerial vehicles (UAVs).

2. Description of the Related Art

An unmanned aerial vehicle (UAV) is a flying device that does not require an onboard pilot, and is typically piloted by remote control, autonomously, or some combination thereof. UAVs often include cameras. In recent years, UAVs have become increasingly affordable and popular in part due to the proliferation of smaller, more powerful, more energy-efficient, and more affordable computers, GPS receivers, cameras, and other electronic components.

UAVs are also sometimes popularly referred to as "drones," though some consider the term "drone" to refer to a subset of UAVs that can be operated out of eyeshot of an operator and beyond line of sight.

Though UAVs allow for the automation of certain tasks, typical UAVs must still be micromanaged. In particular, a user with a collection (e.g., a "fleet") of multiple UAVs typically needs to manually program a flight path individually for each UAV. Each UAV typically must periodically return to the user so that the user can hook up the UAV to an outlet to recharge a battery onboard the UAV, so that the user can refill a fuel container onboard the UAV, so that the user can fix a hardware/software issue with the UAV, so that the user can receive data collected by the UAV, or so that the UAV can be recalled due to poor weather or adverse defensive conditions such as gunfire. Some UAV's flying abilities may be hampered by heat, cold, dust, moisture, sand, salt water, frost, rain, mist, ice, snow, smoke, heavy winds, tornadoes, monsoons, storms, sandstorms, acid rain, radiation, or air pollution.

Typically, a "home base" for a UAV is an identified patch of ground near a user of the UAV, sometimes near a power outlet, generator, or fuel source for recharging or refueling the UAV. Identifying such a home base by a user managing multiple UAVs may result in confusion or collisions in situations where multiple UAVs may try to land at the same home base, or could alternately result in a waste of space by granting various multiple permanent home base spots to multiple UAVs even when some home bases are empty due to their corresponding UAVs being out flying. Additionally, such a home base generally does not protect the UAV from adverse weather or adverse defensive conditions, such as gunfire, and may be conspicuous and difficult to conceal. This may in turn endanger the UAV or its user in a defensive situation such as a warzone, or tip off a criminal that UAV-based security may be present.

Therefore, there is a need for improved UAV management and storage methods and systems.

SUMMARY OF THE CLAIMED INVENTION

A first claimed embodiment of the present invention concerns a system for unmanned aerial vehicle management that includes a cavity that receives an unmanned aerial vehicle with a sensor. The system also includes a communication transceiver that receives a command transmitted by a manager device. The system also includes a memory and a processor coupled to the memory and to the communications module. Execution of instructions stored in the memory by the processor performs system operations. The system operations include identifying a flight plan to be flown by the unmanned aerial vehicle in order to execute the command and transferring the flight plan to the unmanned aerial vehicle. The system operations also include freeing the unmanned aerial vehicle from the cavity and then receiving the unmanned aerial vehicle via the cavity. The system operations also include receiving sensor data from the sensor of the unmanned aerial vehicle and transmitting the sensor data to a data storage medium accessible by the manager device.

A second claimed embodiment of the present invention concerns a method for unmanned aerial vehicle management. The method includes receiving an unmanned aerial vehicle via a cavity of a base module, the unmanned aerial vehicle including a sensor. The method also includes receiving a command at the base module, the command transmitted by a manager device. The method also includes identifying a flight plan by the base module, the flight plan to be flown by the unmanned aerial vehicle in order to execute the command, and then transferring the flight plan from the base module to the unmanned aerial vehicle. The method also includes freeing the unmanned aerial vehicle from the cavity of the base module and then receiving the unmanned aerial vehicle via the cavity of the base module. The method also includes receiving sensor data from the sensor of the unmanned aerial vehicle at the base module and then transmitting the sensor data from the base module to a data storage medium accessible by the manager device.

A third claimed embodiment of the present invention concerns a non-transitory computer-readable storage medium, having embodied thereon a program executable by a processor to perform a method for unmanned aerial vehicle management. The executable method includes receiving an unmanned aerial vehicle via a cavity of a base module, the unmanned aerial vehicle including a sensor. The executable method also includes receiving a command at the base module, the command transmitted by a manager device. The executable method also includes identifying a flight plan by the base module, the flight plan to be flown by the unmanned aerial vehicle in order to execute the command, and then transferring the flight plan from the base module to the unmanned aerial vehicle. The executable method also includes freeing the unmanned aerial vehicle from the cavity of the base module and then receiving the unmanned aerial vehicle via the cavity of the base module. The executable method also includes receiving sensor data from the sensor of the unmanned aerial vehicle at the base module and then transmitting the sensor data from the base module to a data storage medium accessible by the manager device.

BRIEF DESCRIPTION OF THE FIGURES

FIG. 1A illustrates a top-loading box-shaped base module in a launch or recovery configuration.

FIG. 1B illustrates a top-loading box-shaped base module in a storage configuration.

FIG. 2A illustrates a top-loading cylindrical base module in a launch or recovery configuration.

FIG. 2B illustrates a side-loading box-shaped base module in a launch or recovery configuration.

FIG. 5 illustrates various elements of an unmanned aerial vehicle and various elements of a base module.

FIG. 8 illustrates an exemplary user interface identifying an unmanned aerial vehicle.

FIG. 12 illustrates an unmanned aerial vehicle with a robotic arm collecting a sample to be stored in a sample holder.

DETAILED DESCRIPTION

Figure 2C:
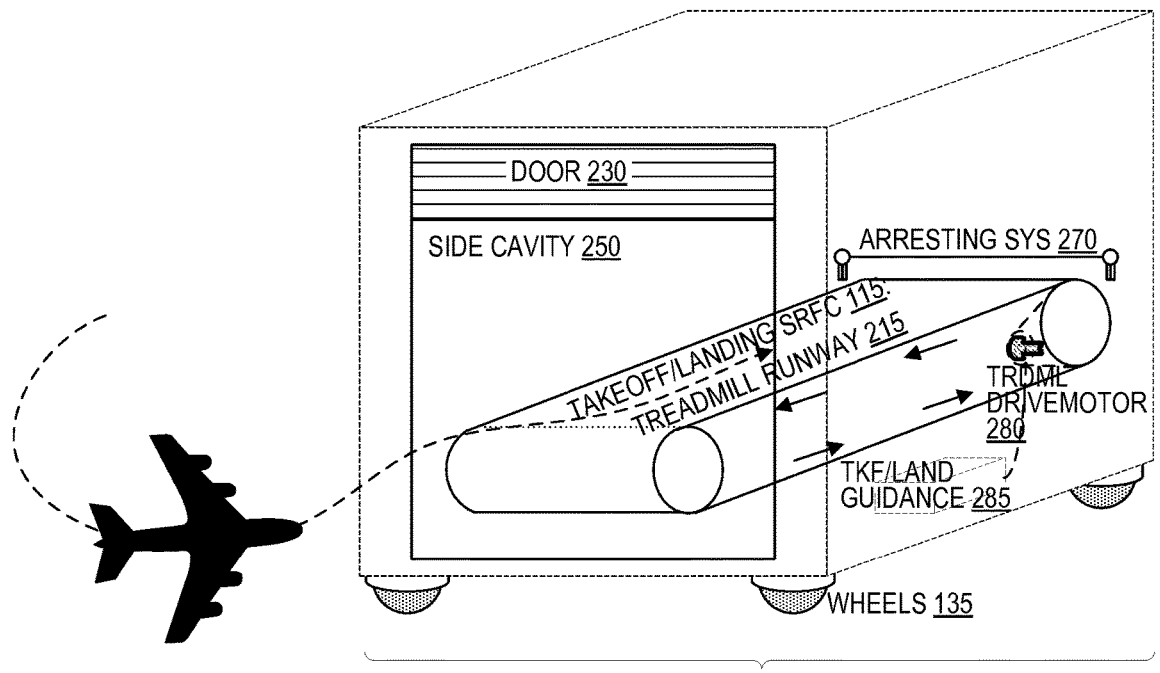
FIG. 2C illustrates a side-loading box-shaped base module with a treadmill runway receiving a landing winged unmanned aerial vehicle.

A base module 105 may be used to receive and house one or more unmanned aerial vehicles 100 (UAVs 100) via one or more cavities 150/250. The base module 105 receives commands from a manager device and identifies a flight plan that allows a UAV to execute the received commands. The base module transfers the flight plan to the UAV and frees the UAV. Once the UAV returns, the base module once again receives it. The base module then receives sensor data from the UAV from one or more sensors onboard the UAV, and optionally receives additional information describing its flight and identifying success or failure of the flight plan. The base module transmits the sensor data and optionally the additional information to a storage medium locally or remotely accessible by the manager device. The UAV's support systems may thus include the base module 105, the management device 600, and the network systems 620. In some cases, multiple management devices may be use, and may follow a hierarchy with a master management device and multiple regional or local management devices. Data can flow bi-directionally between the UAV 100 and its support systems during and between flights. Unique UAV platform identification can be accomplished by communication ID, U.S. FAA Aircraft Vehicle Registration, ICAO international registration, radar data or through registration into the manager device 600.

The unmanned aerial vehicle 100 (UAV) management system may include a 3-D ground radar system integrated into and storage methods and systems. Typical current Federal Aviation Administration (FAA) and military radar systems do not work well below 500 feet AGL. Therefore the UAV 100 in the present invention may be equipped with identification, encoding altimeter and a transponder and coupled to the UAV 100 management system cited in this invention which can sort out traffic separation, collision avoidance, meets Automatic Dependent Surveillance-Broadcast (ADS-B) FAA requirements, conflicts and navigation during all aspects of UAV 100 flight. This system can be a standalone system from the current FAA radar system. The UAV 100 may receive from the base module 105 navigation, collision avoidance, weather, re-tasking of objectives and missions.

The base module 105 may be an environmentally self-contained modular/transportable pod/shelter system. Base modules 105 may be used together or connected together to form an operation base. Base modules 105 may protect one or more UAVs 100 from elements while in long term or short-term storage, and may themselves be fixed or mobile, optionally serving as a way of securing drones for transport. Base modules 105 may be in charge of flight planning and interactive data collection from UAVs 100. Base modules 105 may in some cases be inflatable or have inflatable portions. Base modules 105 can allow for ground control, flight operations and maintenance. Base modules 105 can be climate controlled, secured and is managed by local or remote management device 600.

A fleet operations center may have multiple base modules 105. Base modules 105 may be coupled to land-based structures, water-based structures, vehicles, or some combination thereof. For example, base modules 105 may be coupled to buildings, buoys, oil rigs, automobiles, watercraft, or aircraft. Therefore, parts of a fleet operations center may be stationary or mobile. A mobile base module 105 may be useful as it can become operational in short notice to support first-responders in a hurricane, flood, avalanche, earthquake, volcanic eruption, terror attack, disease outbreak, or other disaster. For smaller UAVs 100, a portable base module 105 may be very small and may even fit into a suitcase, or briefcase. Base modules 105 may be camouflaged or hidden to look inconspicuous even if carried by a person in public. For example, a base module 105 may be camouflaged as, or hidden within, a suitcase, briefcase, laptop, or binder.

The base module 105 can take on various shapes, can be of varying sizes, and may include a variety of possible configurations. Some base modules 105 can be used to store, launch, and recover a single unmanned aerial vehicle 100 (UAV), as illustrated in the exemplary base modules 105 of FIG. 1A, FIG. 1B, FIG. 2A, and FIG. 2B. Some base modules 105 can be used to store, launch, and recover multiple unmanned aerial vehicles 100 (UAVs 100), as illustrated in the exemplary base modules 105 of FIG. 3A and FIG. 3B.

During storage, base modules 105 may provide environmental protection from heat, cold, dust, moisture, fungus, sand, salt water, frost, rain, mist, ice, snow, smoke, heavy winds, tornadoes, monsoons, storms, sandstorms, acid rain, radiation, or air pollution. Base modules 105 may include interior climate control systems (not pictured) that may include passive air filters, active air filters, vacuum suction systems, vacuum ejectors, electric heaters, gas-based heaters, fans, air conditioners, humidifiers, dehumidifiers, waxing agents/sprays, washing agents/sprays, de-icing agents/sprays, anti-bacterial agents/sprays, anti-microbial agents/sprays, anti-fungal agents/sprays, pH-neutralizing agents/sprays, or some combination thereof. Base modules 105 may also provide defensive protection to stored UAVs 100 from gunfire, explosive blasts, flames, smoke, corrosive gases, shrapnel, and ballistics. Base modules 105 may also include electromagnetic shielding to protect stored UAVs 100 from being accessed and/or controlled by unauthorized parties such as malicious hackers and to protect UAVs 100 from being disabled by electromagnetic pulse (EMP) weapons typically used to disable electronics. Such electromagnetic shielding may include passive electromagnetic shielding, such as a Faraday cage, and may further include active electromagnetic shielding, such as magnetic shielding via ferromagnetic coatings, electromagnets, or superconductors.

FIG. 1A illustrates a top-loading box-shaped base module 105 in a launch/recovery configuration 170.

The base module 105 of FIG. 1A is configured to be used with a UAV 100. In particular, the base module 105 may be used to receive a UAV 100, store the UAV 100, to recharge the UAV 100, to free the UAV 100 to allow it to take flight, to communicate with the UAV 100 during storage and/or during flight, and to assist the UAV 100 during takeoffs and landings.

The base module 105 may provide a flight plan for the UAV 100. The UAV 100 may execute the flight plan remotely, autonomously, semi-autonomously, or some combination thereof. For example, the flight plan may have an exact flight path for the UAV 100 to follow, or it may merely identify waypoints, with the UAV 100 moving autonomously between waypoints. The flight plan could also simply identify a mission without any particular points or paths defined, such as locating an object within a larger area, allowing the UAV 100 some autonomy in between.

The UAV 100 may use autonomous systems to assist with takeoff and landing, including computer-controlled adjustments to the altitude, positioning, and rotation of the UAV 100 during takeoff and landing. The base module 105 may also use autonomous systems to assist with takeoff and landing of a UAV 100, including computer-controlled adjustments to the altitude, positioning, and rotation of the takeoff and landing surface 115 of the base module 105 as compared to the path of an incoming or outgoing UAV 100. In some cases, the takeoff and landing surface 115 may be a moving surface as in the treadmill runway 215 of FIG. 2C and FIG. 2D. A takeoff/landing guidance system 285 can help the base module 105 position itself as appropriate to aid a UAV 100 with takeoff or landing procedures. For example, the base module 105 may use cameras, radar, or sonar to identify positioning and angle of approach of a landing UAV 100, or may receive positioning and angle of approach data from the UAV 100, may compare this to the base module 105's own position and angle as detected via GPS receiver onboard the base module 105, and may direct the base module 105's wheels 135 to reposition the base module 105 of FIG. 1A as necessary to ensure that a proper and safe landing UAV 100. For example, if the UAV 100 is slightly too far to the left and is in danger of missing the takeoff/landing surface 115, the takeoff/landing guidance system 285 of the base module 105 can direct the wheels 135 to move it slightly to the left to align the UAV 100's predicted path with the treadmill runway 215, or can direct the wheels 135 to rotate the base module 105 as appropriate. The base module 105 may also factor in wind or other weather conditions into takeoff and landing assistance.

The base module 100 may also use its wheels 135 to move more significant distances either autonomously or as requested by a manager device 100. For example, a base module 100 used in a military context might be instructed to use its wheels 135 to relocate itself out of a warzone area that could lead to its damage or destruction. Similarly, the base module 100 could detect a warzone area via cameras and/or microphones onboard the base module 100 and autonomously relocate itself via its wheels 135. The base module 100 could also relocate itself autonomously based on communications from a UAV 100 in order to aid a UAV 100 that is running out charge/fuel. The base module 100 could also relocate itself to avoid potential environmental hazards that could damage the base module 105 and/or any stored UAVs 100,s such as fire or flooding.

The base module 100 may include sensors for locating a nearby UAV 100 such as a GPS receiver, one or more radar detectors, one or more sonar detectors, one or more laser rangefinders, and one or more cameras of any of the types described herein as cameras that can be used by the UAV 100. The base module 100 may also include robotic arms, clamps, arresting cables, nets or magnets to assist UAVs 100 with takeoff and landing.

The base module 100 may also include environmental sensors such as thermometers, humidity sensors, GPS receivers, altimeters, sensors measuring air pollution, microphones, water sensors, and sensors measuring wind. These could trigger the use of air conditioners, filters, and other systems inside the base module 100 meant for the protection of stored UAVs 100. These could also trigger movement of the UAV 100 away from a particular area, for example to avoid flooding.

The base module 105 of FIG. 1A includes a takeoff/landing surface 115 on which a UAV 100 may land or take off from. The takeoff/landing surface 115 of FIG. 1A is illustrated in a launch/recovery configuration 170, meaning that the takeoff/landing surface 115 is currently in a position that ensures that the UAV 100 is not encumbered from takeoff or landing attempts. The takeoff/landing surface 115 illustrated in FIG. 1 is only moderately larger than the UAV 100 itself, indicating that the UAV 100 of FIG. 1 is a UAV 100 that is capable of vertical takeoff or landing (VTOL).

Figure 4B:
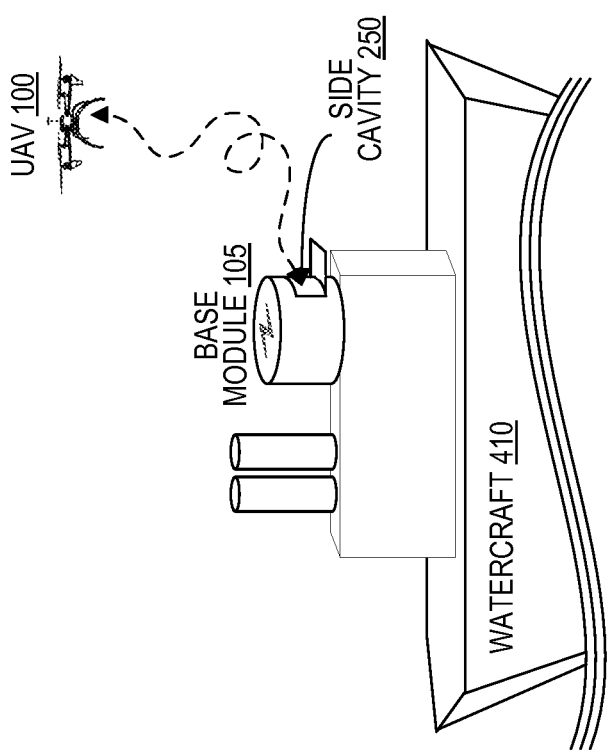
FIG. 4B illustrates a watercraft containing a side-loading cylindrical base module in a launch or recovery configuration.
Figure 4A:
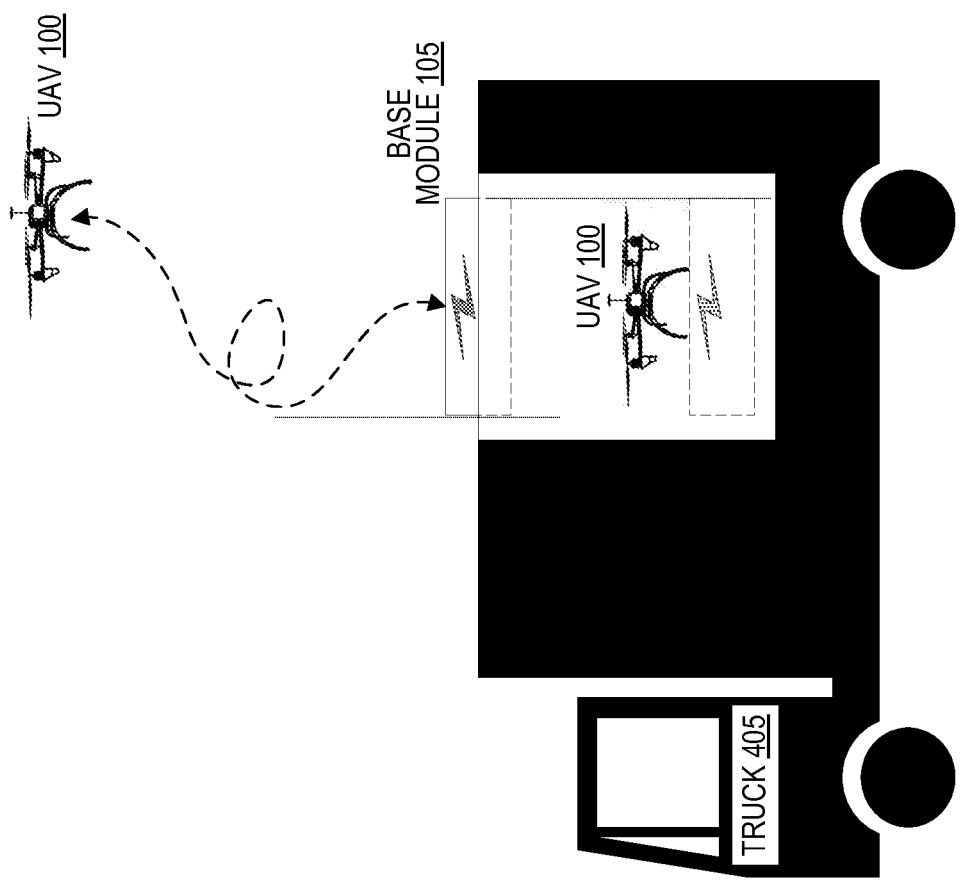
FIG. 4A illustrates a truck containing a stacked multi-vehicle top-loading box-shaped base module with a first stored unmanned aerial vehicle and a second launched unmanned aerial vehicle.
Figure 4C:
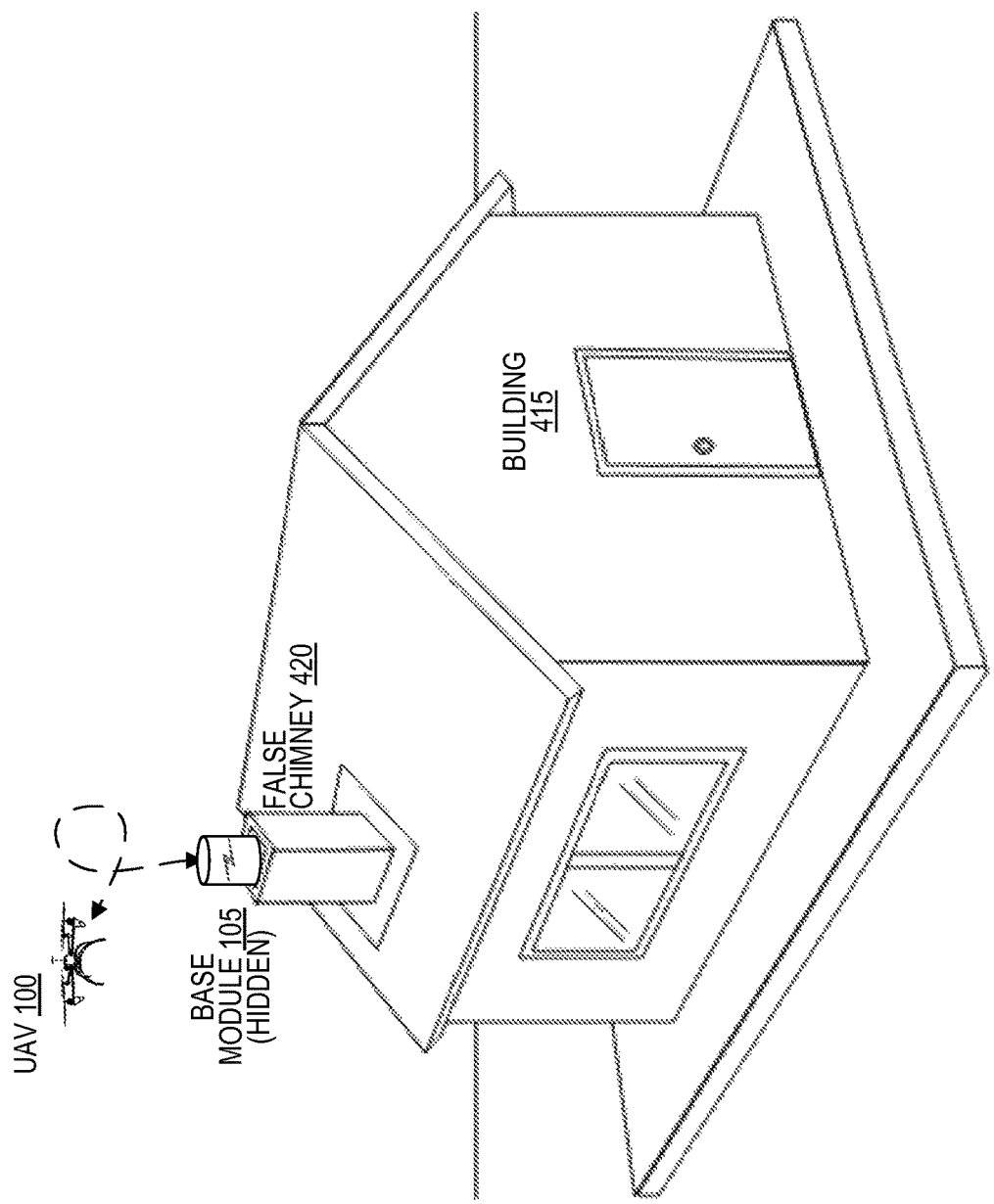
FIG. 4C illustrates a building containing a top-loading base module in a launch or recovery configuration.
Figure 4E:
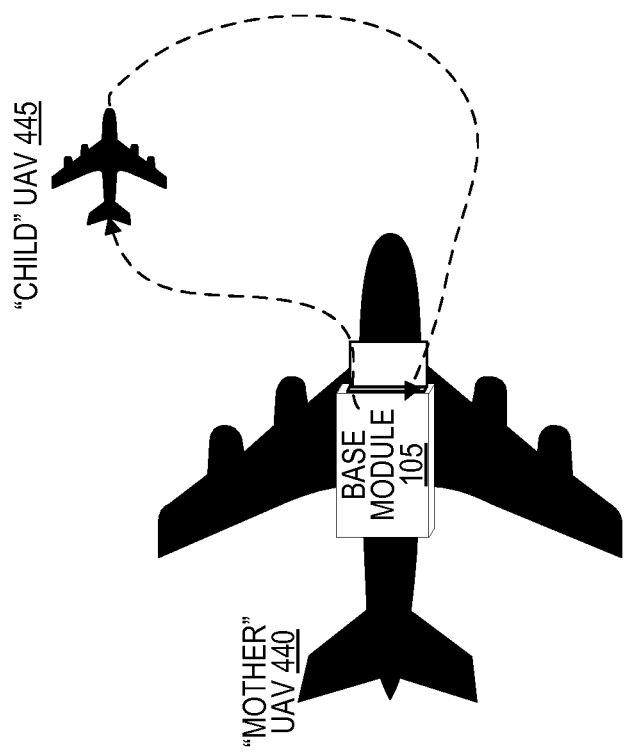
FIG. 4E illustrates a winged "mother" unmanned aerial vehicle with a side-loading cylindrical base module in a launch/recovery configuration along with a winged "child" unmanned aerial vehicle.

A base module 105 may alternately be configured to support a UAV 100 that is not capable of VTOL, such as the winged UAVs 440 and 445 illustrated in FIG. 4E. Such base modules 105 may include a different type of takeoff/landing surface 115, such as a runway, illustrated in a motorized form in FIG. 2C and FIG. 2D.

In some cases one or more alternate landing sites may be identified for a UAV 100, either by the base module 105, by a manager device 600, by the UAV 100 itself identifying an appropriate landing site, or some combination thereof. The alternate landing site may be another base module 105 or simply another area where the UAV 100 can safely land and/or be protected from poor weather or threats. An alternate landing site may be useful, for example, if the UAV 100 is prevented from returning to its original base module 105 due to poor weather, lack of fuel or battery power, dangerous defense or wartime conditions, mechanical problems within the UAV 100 or the original base module 105, detection of an impending threat, or some combination thereof. In some cases, a flight plan may purposely entail a UAV 100 flying from a first base module 105 to a second base module 105 in a different location, for example after a long flight that consumes a lot of fuel or battery power and does not leave enough for a trip back to the original base module 105.

The launch/recovery configuration 170 of FIG. 1A raises the takeoff/landing surface 115 above the rest of the base module 105 using a motor 125 and a set of rails 120 along which the takeoff/landing surface 115 can move vertically. In some cases, the takeoff/landing surface 115 may be moved up quickly/forcefully along the rails 120 to aid the UAV 100 in takeoff by granting it some vertical momentum. Once the UAV 100 has completed its flight and landed on the takeoff/landing surface 115, the rails 120 and motor 125 can then be used to lower the takeoff/landing surface 115 and UAV 100 into the base module 105 to be stored in the storage configuration 175 illustrated in FIG. 1B.

The takeoff/landing surface 115 may also include or be coupled to a power transfer module 110 as illustrated in FIG. 5. The power transfer module 110 may be used to transfer power to a power storage module 505 of the UAV 100 after the UAV 100 returns to the base module 105 from a flight. The power storage module 505 of the UAV 100 may include a rechargeable battery, a replaceable battery, a fuel tank, a chemical power storage system, or a mechanical power storage system (e.g., compressed air/fluid/nuclear/chemical/ground laser power energy storage).

The process of transferring power from the power transfer module 110 of the base module 105 to the power storage module 505 of the UAV 100 may include recharging a battery of the UAV 100 with electric current from a power source/storage module 555 of the base module 105, or may include refilling a fuel-tank-based power storage module 505 of the UAV 100 with fuel supplied by the base module 105. Toward these ends, the base module 105 may include a port, plug, jack, or nozzle. The process of transferring power from the power transfer module 110 of the base module 105 to the power storage module 505 of the UAV 100 may also include replacing one or more used-up batteries of the UAV 100 with one or more fresh replacement batteries 130 stored in and/or previously charged by the base module 105, or it may include replacing a used-up fuel tank of a fuel-tank-based power storage module 505 the UAV 100 with a fresh replacement fuel tank stored by and/or previously filled by the base module 105. The process of transferring power from the power transfer module 110 of the base module 105 to the power storage module 505 of the UAV 100 may also include compressing air/fluid in an air/fluid tank of the UAV 100. The process of transferring power from the power transfer module 110 of the base module 105 to the power storage module 505 of the UAV 100 may include some combination of the above-recited processes.

In cases where the power transfer module 110 transfers power by providing an electrical current or fuel to the UAV 100, such as to a rechargeable battery of the UAV 100 or refuel a fuel canister of the UAV 100, the base module 105 may include an port, a cable, a tube, a pipe, a jack, an injector, or some combination thereof for this purpose. In some cases, batteries may be recharged wirelessly through inductive charging, solar, solar generator. The power transfer module 110 may draw its power/fuel from a power source 555 or power storage 555 that powers the base module 105, or from a separate power source or power storage unit within the power transfer module 110 that is solely dedicated to recharging or refueling UAVs 100. Such power sources or power storage may include electrical wall socket power outlet, a fuel line, a self contained power generator (e.g., operating on fuel, solar power, wind power, compressed air power, chemical power, hydroelectric power, nuclear power, or mechanical power), a capacitor, or a battery.

In cases where the power transfer module 110 transfers power by physically transferring a fresh replacement battery 130 or a fresh replacement fuel canister, the power transfer module 110 may include a mechanical system for performing such replacement tasks. In particular, the power transfer module 110 may include robotic arms or other mechanisms for removing used batteries or fuel canisters from a UAV 100 and for inserting the fresh replacement battery 130 or fresh replacement fuel canister into the UAV 100. The power transfer module 110 may store one or more fresh replacement batteries 130 or fresh replacement fuel canisters internally. For example, the base modules 105 of FIG. 1A, FIG. 1B, and FIG. 2A are all illustrated as storing three replacement batteries 130 each. The base module 105 can charge any replacement batteries 130 it stores while they are being stored, and can refuel any replacement fuel canisters it stores while they are being stored. Such replacement-based power transfer allows a UAV 100 to land after a long flight and very quickly launch again after the replacement battery 130 or replacement fuel canister is inserted. Replacing batteries in particular is often much faster than charging them, meaning that this supplies a speed benefit. With this in mind, a base module 105 may sometimes be placed in a remote area as a "pit stop" where a preplanned battery replacement or fuel canister replacement may needed to aid a UAV 100 that is in the middle of a longer flight.

Figure 13:
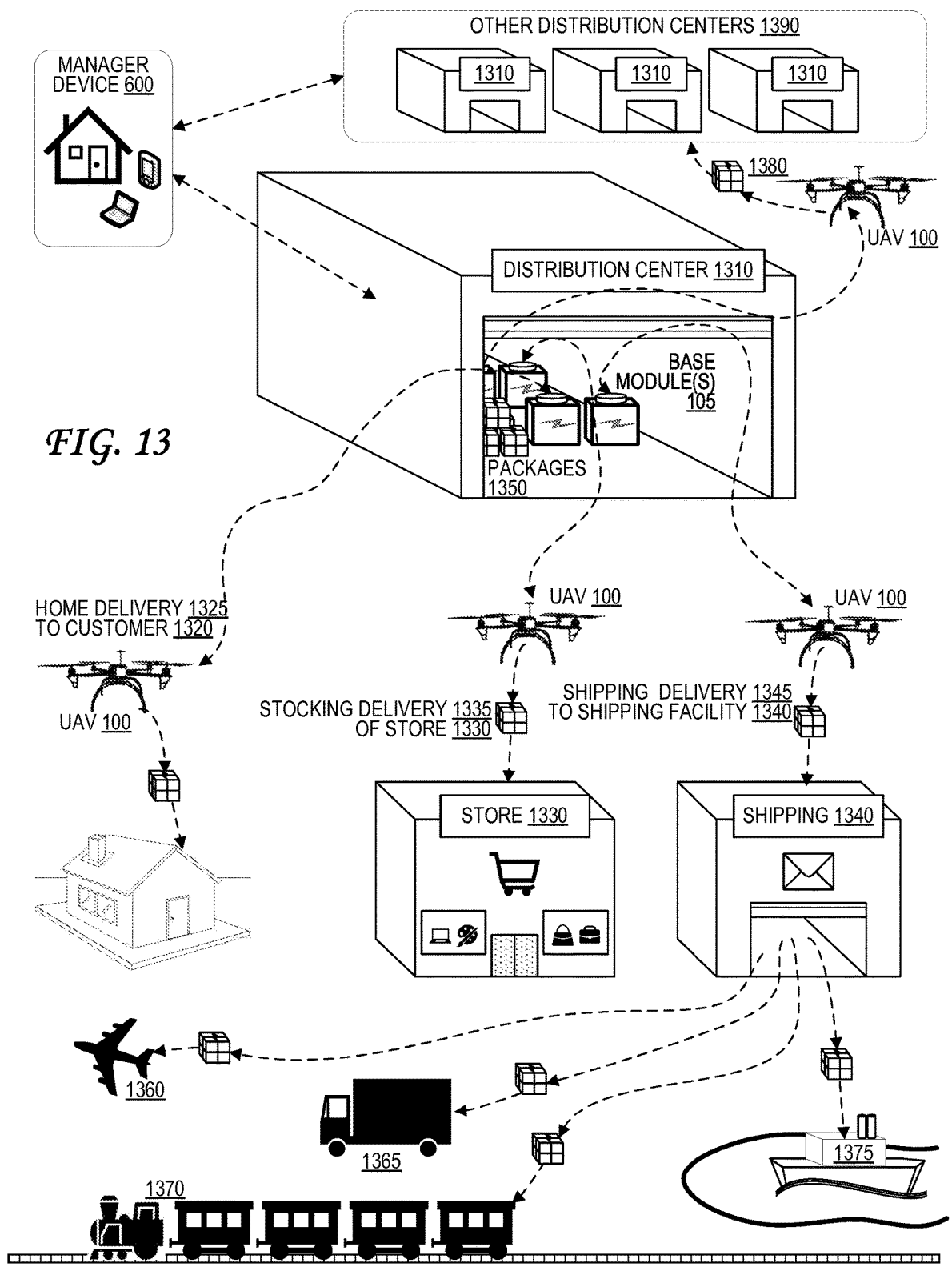
FIG. 13 illustrates a package distribution ecosystem using unmanned aerial vehicles for transportation of packages.

The base module 105 may also take care of other "refilling" or "restocking" operations not related to power, such as refilling or restocking weed/insecticide/seeding aerial spray system or reloading the packages 1350 of FIG. 13 for delivery.

The base module 105 may also retrieve objects and/or data from the UAV 100, such as the samples 1210 along with location data corresponding to location data identifying GPS locations and/or altitudes of sample sources 1220. Data from the UAV 100 may in some cases also identify contents or characteristics of such samples 1210, as the UAV 100 may include laboratory/assay systems to perform assay experiments in while gathering samples 1210 or in flight. 1210 of FIG. 12 or packages 1350 of FIG. 13, from the UAV 100. The base module 105 may in some cases perform chemical assays on a sample 1210 to determine its ingredients, characteristics, or quality and may report this information back to the manager device 600 or network system 620.

The base module 105 of FIG. 1A includes a communications transceiver 145. Each UAV 100 may also include a communications transceiver 530. Each communications transceiver 145/530 may include wired communication functionality and/or wireless communication functionality. The communications transceiver 145 of the base module 105 may use wired or wireless communications protocols to communicate with the communications transceiver 530 of the UAV 100 during storage. The communications transceiver 145 of the base module 105 may use wireless communications protocols such as radio-frequency (RF), Bluetooth, or Wi-Fi to communicate with the communications transceiver 530 of the UAV 100 during storage.

The communications transceiver 145 may also be used to communicate in a wired or wireless manner with a manager device 600, a communication station 615 such as a cell phone tower, a satellite 610, a satellite phone, a radio frequency (RF) radio transceiver, one or more network servers 620, or some combination thereof. The communications transceiver 145 of the UAV 100 may be used by the UAV 100 to communicate wirelessly with the base module 105, a communication station 615 such as a cell phone tower, a satellite 610, one or more network servers 620, or some combination thereof.

The communications transceivers 145/530 of the base module 105 and of the UAV 100 may be compatible with various types of wired network connections, such as fiber optic network connections, Ethernet network connections including, but not limited to, coaxial data cable network connections, cloud, data center or dial-up modem network connections. The communications transceiver 145 of the UAV 100 may engage in wired communication, for example, when it is stored within the base module 105. The communications transceiver 145 s of the base module 105 and of the UAV 100 may be compatible with various types of wireless network connections, such as Wi-Fi network connections, WiMAX network connections, global system for mobile communications (GSM) network connections, code division multiple access (CDMA) network connections, general packet radio service (GPRS) network connections, enhanced data GSM environment (EDGE) network connections, third generation (3G) cellular network connections, fourth generation (4G) cellular network connections, Long Term Evolution (LTE) cellular network connections, other 802.x network connections, Bluetooth network connections, radio frequency network connections (including standard radio frequencies, high frequencies, very high frequencies, ultrahigh frequencies), microwave-frequency network connections, ultra-high-frequency (UHF) sound-based connections, radar-based communications, or satellite-based network connections.

The communications transceivers 145 of the base module 105 and of the UAV 100 may also include a Global Positioning System (GPS) as well as a radar, Sound Navigation And Ranging (SONAR), or Light Detection and Ranging (LIDAR) based systems, which may be used by the base module 105 to keep track of one or more flying UAVs 100, or by the UAVs 100 to keep track of a base module 105 and/or other items that the UAV 100 is tasked to detect, locate, and/or retrieve. In some cases, the communications transceiver 145 of the UAV 100 may use the communications transceiver 145 of the base module 105 as a proxy for certain communications. For example, the UAV 100 may communicate data to the base module 105 that is then communicated to the manager device 600 using the base module 105 100's 3G cellular tower-based internet connection, or vice versa. The communications transceivers 145 of both the base module 105 and the UAV 100 are described further in relation to FIG. 5, respectively.

The base module 105 of FIG. 1A also includes an electronics module 140, which may house various electronic hardware components and store various software elements and data structures. For example, the electronics module 140 may be a computing system 900 of FIG. 9, or may include at least a subset of the components and elements of the computing system 900 of FIG. 9. The electronics module 140 also include the base module 105's central controller/processor 565 and other hardware and software elements 550 of the base module 105 identified in FIG. 5.

The base module 105 of FIG. 1A also includes a set of cylindrical wheels 135 for easy transportation and will operate via motors 125, engines, and communications with central facility in robotic mode. These wheels 135 may be capable or rotating side-to-side as well, for easier turning. The wheels 135 are optional and may be replaced with other transportation-assisting components, such as caterpillar treads, train track wheels 135, spherical wheels 135 as illustrated in FIG. 2B, pedrail wheels 135, a mechanical walking mechanism, a maglev mechanism, or a sled/skate mechanism.

The base module 105 of FIG. 1A may be constructed primarily from metal, wood, styrofoam, glass, plastic, corrugated metal, fiberglass, a composite material or some combination thereof. The base module 105 may be self-contained or include external modules. The base module 105 may include a thermostat and heating and/or cooling unit so that the UAV 100 and other internal parts (e.g., replacement batteries 130) may be stored at optimal temperatures or at safe temperatures. The base module 105 may allow for receipt of a "launch trigger" signal from one or more management devices (e.g. master, remote, or slave devices, or individual security control panels in a home, school, business, farm, corporate headquarters, law enforcement agency, or military base).

Launching the UAV 100 from the base module 105 may begin with raising the takeoff/landing surface 115 to a first predetermined height or altitude, followed by the UAV 100 flying up to at least a second predetermined height or altitude higher than the first predetermined height or altitude.

FIG. 1B illustrates a top-loading box-shaped base module 105 in a storage configuration 175. In particular, the base module 105 of FIG. 1B is the base module 105 of FIG. 1A but in a storage configuration 175 rather than a launch/recovery configuration 170.

The base module 105 of FIG. 1B has entered into a storage configuration 175 by using the motor 125 and rails 120 to lower the takeoff/landing surface 115 into the base module 105, exposing a top cavity 150 through which the takeoff/landing surface 115 had been presented while the base module 105 was in the launch/recovery configuration 170 illustrated in FIG. 1A.

The top cavity 150 of the base module 105 of FIG. 1B may be covered manually or automatically with a lid 160, which is illustrated in FIG. 1B as a separate from the base module 105, but may alternately be coupled to the base module 105 as in the lid 160 of FIG. 2A by a hinge, a swinging mechanism, a sliding mechanism, or some combination thereof. The lid 160 of FIG. 1B includes solar panels 165 to assist in providing electrical energy to power the power transfer module 110, the replacement batteries 130, and/or the rest of the base module 105, such as the motor 125, the electronics module 140, and the communications transceiver 145.

FIG. 2A illustrates a top-loading cylindrical base module 105 in a launch/recovery configuration 170. The base module 105 of FIG. 2A includes many similar components to the base module 105 of FIG. 1A and FIG. 1B, though the shape is cylindrical, and the motor 125 and rails 120 that were used to vertically move the takeoff/landing surface 115 of the base module 105 of FIG. 1A and FIG. 1B have been replaced by a piston and fluid-tube system (e.g., using a compressed gas or liquid).

While the cylindrical base module 105 of FIG. 2A has a top cavity 150, a cylindrical base module 105 may alternately include a side cavity 205 as illustrated in the side-loading cylindrical base module 105 of FIG. 2B.

FIG. 2B illustrates a side-loading box-shaped base module 105 in a launch/recovery configuration 170. The base module 105 of FIG. 2B includes many similar components to the base module 105 of FIG. 1A and FIG. 1B, though the motor 125 and rails 120 that were used to vertically move the takeoff/landing surface 115 of the base module 105 of FIG. 1A and FIG. 1B have been replaced by a door 230 (e.g. which may be manually opened/closed or automatically opened/closed via a motor) that allows the UAV 100 to take off and land through a side cavity 205 in a side of the base module 105. The side-loading feature of the base module 105 of FIG. 2B may be advantageous when the takeoff/landing surface 115 is a runway rather than a VTOL landing "target" surface as illustrated in FIG. 4E, or when the base module 105 is built into a wall. The side-loading feature of the base module 105 of FIG. 2B may also be advantageous in that it offers a consistent top surface of the base module 105 that may be used to house solar panels to provide electrical power to help power the power transfer module 110 and/or the rest of the base module 105.

The side-loading base module 105 of FIG. 2B may also include a horizontal movement system (not shown) for the takeoff/landing surface 115, which may include a horizontally-oriented rail-and-motor 125 system (e.g., similar to the vertical rail-and-motor 125 system of FIG. 1A and FIG. 1B) or a horizontally-oriented fluid-and-piston system (e.g., similar to the vertical rail-and-motor 125 system of FIG. 2A) to push the takeoff/landing surface 115 horizontally outward from the base module 105 (not shown) to set up the launch/recovery configuration 170 and return the takeoff/landing surface 115 horizontally inward to set up the storage configuration 175. The base module 105 can also operate with low door 230 system to contain, store, and maintain unmanned ground based vehicles in the same manner as UAVs 100.

A side-loading base module 105 similar to the one in FIG. 2B may be used to store multiple UAVs 100, either by using a single large door 230 and a single large side cavity 250 like a hangar, or by using multiple doors 230 and multiple side cavities 25 like a locker room or cabinet, or some combination thereof.

FIG. 2C illustrates a side-loading box-shaped base module 105 with a treadmill runway 215 receiving a landing winged unmanned aerial vehicle 100.

The UAV 100 may use autonomous systems to assist with takeoff and landing, including a takeoff/landing guidance system 285 that controls a treadmill drivemotor 280 of the treadmill runway 215 of FIG. 2C, which serves as the takeoff/landing surface 115 of the base module 105 of FIG. 2C. The UAV 100 of FIG. 2C is a winged UAV 100 that is illustrated performing a landing on the treadmill runway 215.

The takeoff/landing guidance system 285 of the base module 105 can use radar or camera-based systems to identify positioning, angle, inclination, pitch, and speed of the incoming UAV 100 is going, or can simply communicate with the incoming 100 to request and receive these measurements from sensors onboard the UAV 100. The takeoff/landing guidance system 285 then adjusts the speed of the a treadmill drivemotor 280 of the treadmill runway 215 to allow the UAV 100 to properly decelerate after landing without actually requiring a physically long runway, thus saving space. This can be done, for example, by matching the speed of the surface of the treadmill runway 215 to within a predetermined range of the speed of the incoming UAV 100, but in the opposite direction.

The takeoff/landing guidance system 285 of the base module 105 can further adjust the position of the base module 105 relative to the UAV 100 and to adjust the horizontal angle of the base module 105 relative to the UAV 100 via the wheels 135. For example, if the predicted landing path of the UAV 100 would take it slightly too far in a direction and the UAV 100 in danger of missing the side cavity 250, the takeoff/landing guidance system 285 can direct the wheels 135 to rotate the base module 105 and/or move the base module 105 slightly to that direction to align the UAV 100's predicted path with the treadmill runway 215. The takeoff/landing guidance system 285 can factor in effects of wind or other weather conditions into its prediction of the UAV 100's landing path and appropriate assistance. This may be preferable to adjusting the path of the UAV 100 especially when the UAV 100 is winged, as winged UAVs 100 have a limited range of movement and cannot "strafe" horizontally easily change approach angle or altitude without circling around for another landing attempt, which wastes the stored power (battery charge/fuel) onboard the UAV 100 and may be impossible if the reason for the landing is that the UAV 100 needs to recharge or refuel.

The base module 105 may also include vertical and/or rounded tracks at the ends of the treadmill runway 215 along which the altitude of either or both ends of the treadmill runway 215 can be adjusted up or down vertically. This allows the treadmill runway 215 to be raised or lowered to match the predicted landing altitude of of the approaching UAV 100, and allows the vertical angle of the treadmill runway 215 to be adjusted to match the angle of approach of the UAV 100.

The base module 105 of FIG. 2C also includes an arresting system 270 at the end of the treadmill runway, which includes a cord or cable, which may optionally be elastic, that helps physically stop the momentum of the landing UAV 100 if the movement of the treadmill runway 215 and any braking systems of the UAV 100 are insufficient to help the UAV 100 slow to a stop. Similar arresting systems (not pictured) may be placed on the left and right sides of the treadmill runway 215 to help keep the UAV 100 aligned during a landing. The arresting system 270 may also include a net.

The base module 105 of FIG. 2C is also illustrated as including a rolling door 230 similar to a garage door. All of the other variants of the base module 105 illustrated or discussed herein may include this type of door 230.

Figure 2D:
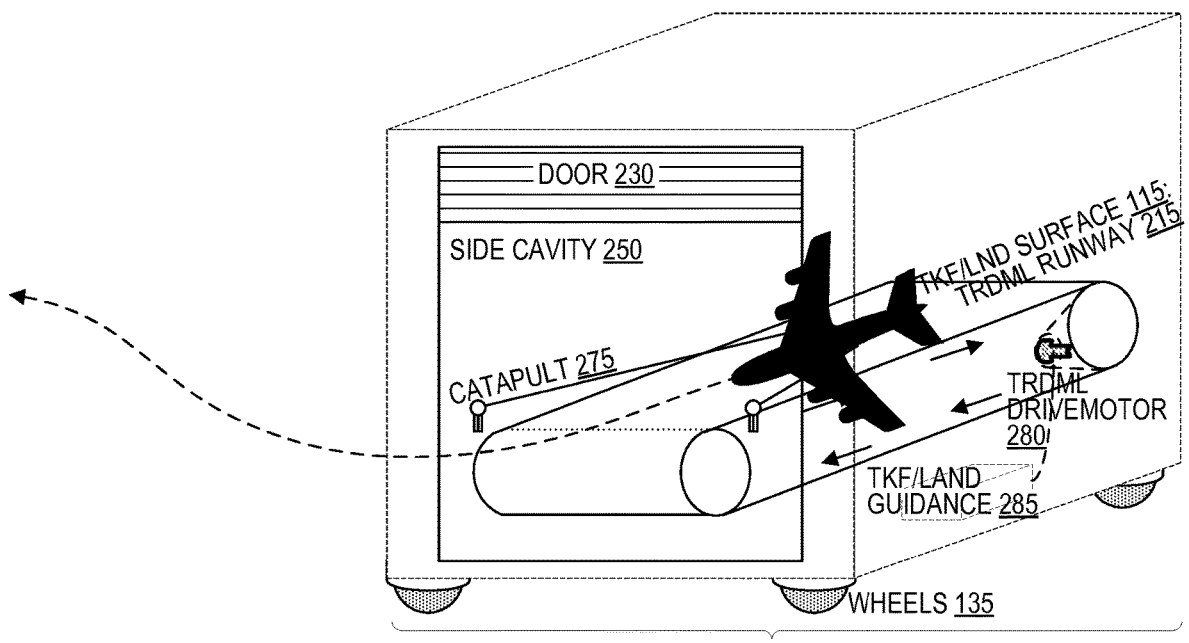
FIG. 2D illustrates a side-loading box-shaped base module with a treadmill runway freeing a launching winged unmanned aerial vehicle.

FIG. 2D illustrates a side-loading box-shaped base module 105 with a treadmill runway 215 freeing a launching winged unmanned aerial vehicle 100. The treadmill runway 215 of FIG. 2D is shown moving in the opposite direction of the UAV 100, allowing the UAV 100 to accelerate relative to the moving surface of the treadmill runway 215 without needing a long runway to do so. After the UAV 100 has reached a sufficient level of acceleration for launch, the treadmill runway 215 of FIG. 2D may slow its movement gradually or stop moving suddenly via brakes to help the UAV 100 move forward and thus aid the launch of the UAV 100 out of the side cavity 250. The treadmill runway 215 may also reverse direction to move in the same direction as the UAV 100 in order to propel the UAV 100 out of the side cavity 250.

The treadmill runway 215 of FIG. 2D also includes a catapult mechanism 275 to help propel the UAV 100 out of the side cavity 250. The catapult mechanism 275 of FIG. 2D uses cords/cables coupled to or looped around portions of the UAV 100 and pulling the UAV 100 in the direction of the side cavity 250. The cords/cables of the catapult mechanism 275 of FIG. 2D may be elastic, driven by springs, driven by counter-weights, driven by motors, or some combination thereof. The catapult mechanism 275 of FIG. 2D functions like a ballista or slingshot, though other catapulting mechanisms 275 may use a trebuchet-style slinging arm. The catapult mechanism 275 of FIG. 2D may serve a dual function as the arresting system 270 of FIG. 2C.

The base modules 105 of FIG. 1A, FIG. 1B, or FIG. 2A may have catapult mechanism 275 that "punches" the UAV 100 directly upwards using the motor 125 or piston 210, for example by rapidly propelling the takeoff/landing surface 115 of those base modules 105 upwards to shoot the UAV 100 out the top cavities 150 of those base modules 105.

A base module 105 may, in some cases, include two or more cavities 150/250 and/or doors 230. For example, the base module 105 of FIGS. 2C and 2D could have a side cavity 250 on either end of the treadmill runway 215. A single arresting system 270 thus could be reused as the catapult 275 without rotation of the UAV 100 or takeoff/landing surface 115 (i.e., the treadmill runway 215 in FIG. 2C and FIG. 2D) inside the base module 105.

It should be understood that while the treadmill runway 215 of FIG. 2C and FIG. 2D is illustrated as located within a side cavity 250 of a base module 105, it may alternately be located within a top cavity 150 of the base module 105 during storage 175, similarly to FIG. 1B, and elevated above the base module 105 during takeoff/landing, similarly to FIG. 1A.

Figure 3B:
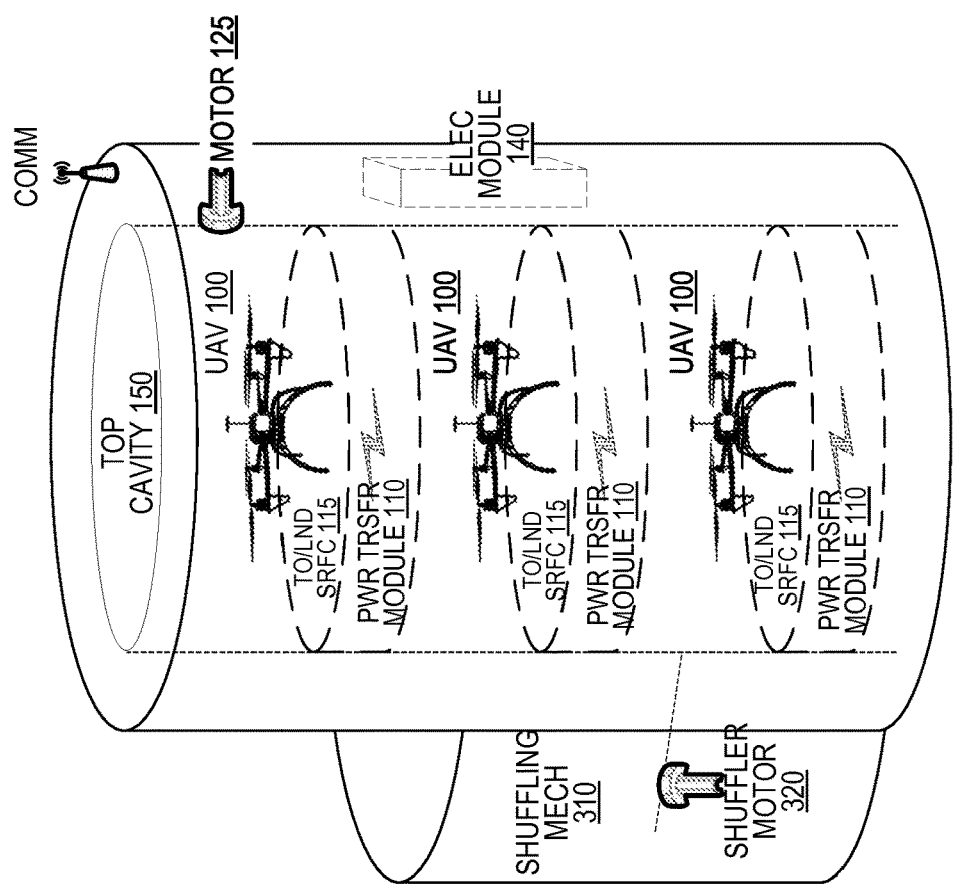
FIG. 3B illustrates a stacked multi-vehicle top-loading cylindrical base module in a launch or recovery configuration.
Figure 3A:
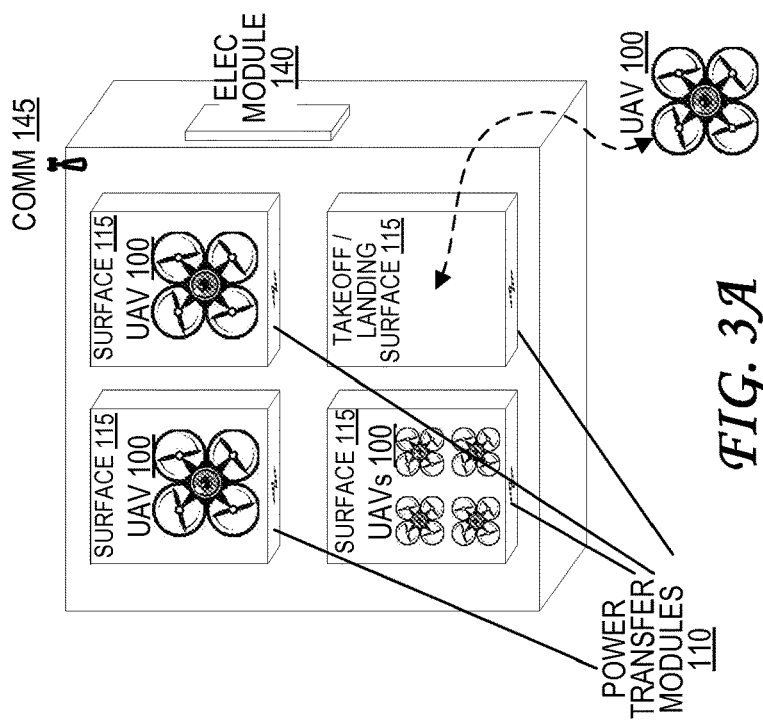
FIG. 3A illustrates a side-by-side multi-vehicle top-loading box-shaped base module in a launch or recovery configuration.

FIG. 3A illustrates a side-by-side multi-vehicle top-loading box-shaped base module 105 in a launch/recovery configuration 170. The base module 105 of FIG. 3A includes many similar components to the base module 105 of FIG. 1A and FIG. 1B, though it includes four side-by-side takeoff/landing surfaces 115, each with a power transfer module 110, and can thus store four UAVs 100 at a single time. Each of these takeoff/landing surfaces 115 and power transfer modules 110 of FIG. 3A may optionally retract into a top cavity 150 as in the base module illustrated in FIG. 1A and FIG. 1B.

FIG. 3B illustrates a stacked multi-vehicle top-loading cylindrical base module 105 in a launch/recovery configuration 170. The base module 105 of FIG. 3B includes many similar components to the base module 105 of FIG. 1A and FIG. 1B, or to the base module 105 of FIG. 2A, though it includes three stacked takeoff/landing surface 115s, each with a power transfer module 110, and can thus store three UAVs 100 at a single time.

Because the combination of a stacked storage formation and a single top-loading cavity can cause difficulties with using the "bottom" or "middle" takeoff/landing surface 115 and any UAV 100 stored thereon, the base module 105 of FIG. 3B can include an optional horizontal "shuffling" mechanism, allowing the vertical order of the takeoff/landing surface 115s, and any UAVs 100 stored thereon, to change by temporarily moving one or more takeoff/landing surface 115s horizontally.

Alternately, a stacked multi-UAV 100 base module 105 similar to the base module 105 of FIG. 3B may forego the shuffling mechanism and instead include one or more side-loading mechanisms similar to the one described in relation to FIG. 2B. Therefore, a base module 105 that stores multiple UAVs 100 may launch or recover the UAVs 100 via one or more top cavities 150, one or more side cavities 250, or some combination thereof.

While the base modules 105 discussed thus far have included top cavities 150 and/or side cavities 250, an alternate base module 105 (not pictured) may include a bottom cavity that can accept a UAV 100. The bottom cavity may then include a bottom door 230 that, when shut, becomes the takeoff/landing surface 115 on which the UAV 100 rests during storage 175. To launch, the door 230 of such a base module may simply open, dropping the UAV 100. While the UAV 100 may require more airspace to stop its fall and gain control of its flight after such a launch, this may be an effective embodiment of the base module 105 if the base module 105 is stored under and overhang of a tall building or on the underside of an aircraft such as an airplane or a "mother" drone 430/440 as in FIG. 4D or FIG. 4E.

FIG. 4A illustrates a truck 405 containing a stacked multi-vehicle top-loading box-shaped base module 105 with a first stored unmanned aerial vehicle 100 and a second launched unmanned aerial vehicle 100. The base module 105 of FIG. 4A includes many similar components to the base module 105 if FIG. 3B, though it is box-shaped and hidden inside the rear of a truck. A side-loaded base module 105 with a side cavity 250 similar to the base module 105 of FIG. 2B could alternately be used so that a UAV 100 may take off or land from the rear or side of the truck. The base module 105 of FIG. 4A could also be used in a different vehicle such as a passenger automobile, a police vehicle, a Sport Utility Vehicle (SUV), a Command RV, or a fire truck. The base module 105 may use a sunroof, baggage compartment, or hood as the lid 160 of a top-loading cavity 165, or by using the baggage compartment door or car door as the side-loading door 230 of a side cavity 250. The base module 105 of FIG. 4A could also be used in a defensive vehicle, such as a tank. The truck 405 may include a shuffling mechanism 310 as discussed in FIG. 3B to launch the currently-stored "bottom" UAV 100 of FIG. 4A, or it could launch it via a side cavity 250.

FIG. 4B illustrates a watercraft containing a side-loading cylindrical base module 105 in a launch/recovery configuration 170. The base module 105 of FIG. 3B includes many similar components to the base module 105 of FIG. 2B, though the base module 105 of FIG. 4B is cylindrical with a side cavity 250 and door 230. The base module 105 may be disguised by including it within a surface of the watercraft, or by disguising a cylindrical base module 105 as a chimney. While the watercraft pictured appears to be a larger fuel or coal ship, the watercraft may be a smaller boat, such as a sailboat or jetski. The watercraft may also be a submarine that may launch or recover a UAV 100 when it surfaces. The base module 105 could also alternately be included within or coupled to a buoy or an oil rig. A base module 105 can be a submergible rig/system that can be hidden underwater when in its storage configuration 175 and can surface in its launch/recovery configuration 105. A base module 105 that is a submergible rig/system may be via motorized rails or pulley systems, or via counterweights, or via propellers coupled to the base module 105, or via pneumatic or hydraulic tubes, via trim/ballast tanks similar to a submarine, or some combination thereof. A base module 105 may also be included within or coupled to a manned aircraft (not shown) or an unmanned aircraft (see FIG. 4D and FIG. 4E) in a similar manner.

FIG. 4C illustrates a building containing a top-loading base module 105 in a launch/recovery configuration 170. The base module 105 of FIG. 3B includes many similar components to the base module 105 of FIG. 4B, and is hidden within a false chimney. The base module 105 of FIG. 4C is thus box-shaped but with a cylindrical takeoff/landing surface 115 and power transfer module 110. The base module 105 of FIG. 4C could alternately be hidden under a roof tile (e.g. in an attic), in a nearby tree (real or fake). Alternately, if the base module 105 was side-loaded as in the base module 105 of FIG. 2B of FIGURE, the base module 105 could be hidden in a window or door 230.

Figure 4D:
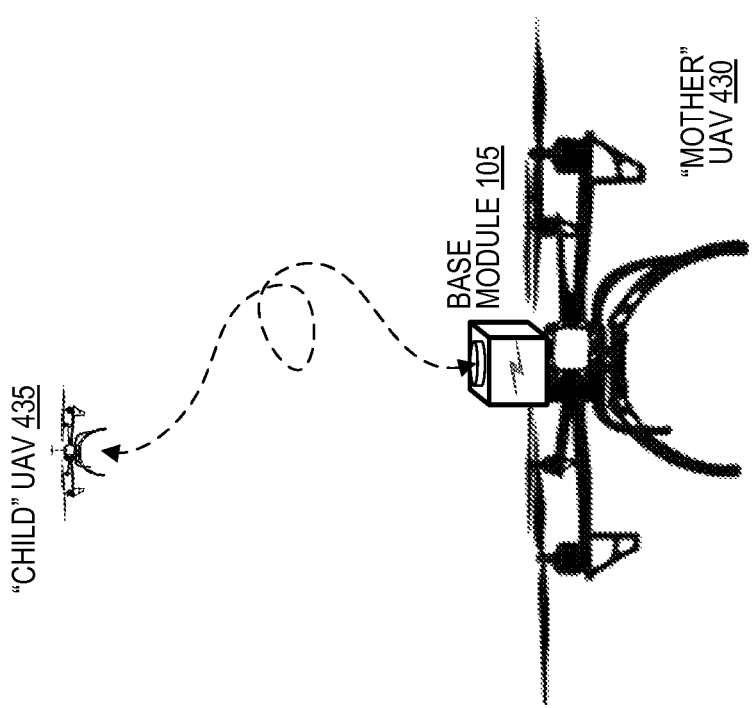
FIG. 4D illustrates a vertical takeoff "mother" unmanned aerial vehicle with a top-loading box-shaped base module in a launch/recovery configuration along with a vertical takeoff "child" unmanned aerial vehicle.

FIG. 4D illustrates a vertical takeoff "mother" unmanned aerial vehicle 430 with a top-loading box-shaped base module in a launch/recovery configuration 170 along with a vertical takeoff "child" unmanned aerial vehicle 435.

FIG. 4E illustrates a winged "mother" unmanned aerial vehicle 445 with a side-loading cylindrical base module 105 in a launch/recovery configuration 170 along with a winged "child" unmanned aerial vehicle 445.

FIG. 5 illustrates various elements 500 of an unmanned aerial vehicle 100 and various elements 550 of a base module 105.

The UAV 100 may include a power storage unit 505. The power storage module of the UAV 100 may include a rechargeable or replaceable battery 545, a fuel tank, a chemical power storage system, or a mechanical power storage system based on compressed air/fluid energy storage.

The UAV 100 may include a power management module 510, which may help control usage of electrical power by helping to control how much electrical power is directed to which components of the UAV 100 and may help the power storage unit last longer by monitoring and controlling electrical power input and output in a way that prolongs a rechargeable battery's lifetime. The power management module 510 may also aid in power transfer operations when the power transfer module 110 of the base module 105 is transferring power to the power storage 505 of the UAV 100. For example, if the power transfer is a recharging of the battery 545, the power management module 510 may ensure that current stops flowing from the power transfer module 110 once the UAV 100 is fully recharged or by ensuring that the current provided by the power transfer module 110 is provided at the correct amperage, wattage, or voltage.

Figure 9:
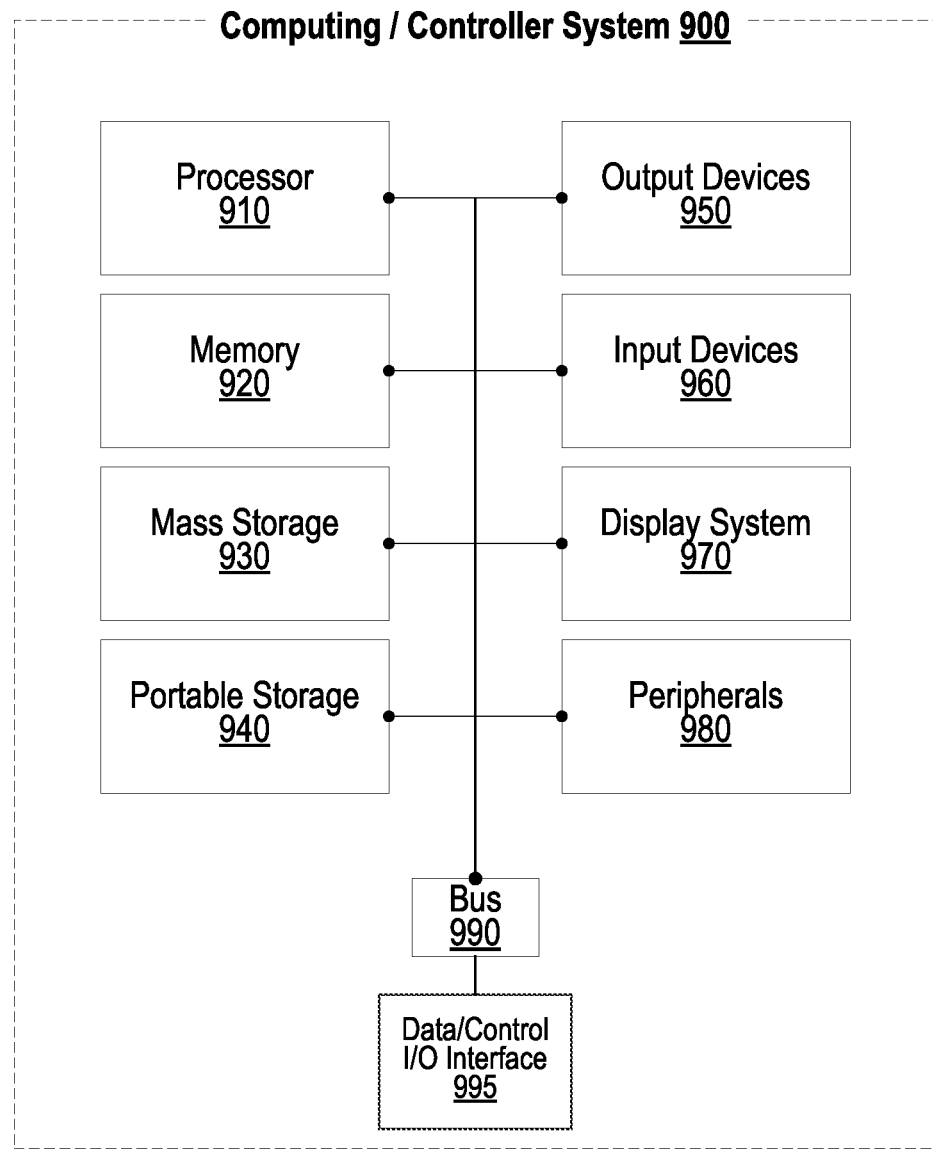
FIG. 9 is a block diagram of an exemplary computing device that may be used to implement an embodiment of the present invention.

The UAV 100 may include a local storage 540, which may be a storage device 930 as described in FIG. 9.

The UAV 100 may include a sensor module 520 that may include one or more sensors, and may store data from the one or more sensors in the local storage. The sensor module may include components that receive an input and/or produce an output. The sensors may include cameras, gyroscopes, laser altimeters, accelerometers (e.g., 3-axis accelerometers connected to a Global Positioning System and an Inertial Measurement Unit to compute accurate position and orientation), vehicle speed-sensors, direction, compass heading, wind sensors, light sensors, laser rangefinders, microphones, speakers (pressure transducers), thermometers, barometers, Sound Detection And Ranging (SONAR) sensors, ground-penetrating radar, Light Detection And Ranging (LIDAR) sensors, laser rangefinders, laser illumination systems radar sensors, magnetometers, day/night light sensors, optical beacon locators, laser illumination systems, gimbal input systems, voice input detection microphone-bases systems, RF receivers and transmitters (i.e., repeaters), weather sensors (e.g., for detecting temperature, wind, rain, snow, hail, lightning, thunder), defense sensors (e.g. gunshot locator systems, explosion locator systems, onboard real time map generation system processed by sensors/onboard computer, producing maps, digital elevation models while in flight).

Cameras that are part of the sensor module 520 may include visible-light cameras, night-vision cameras, infrared cameras, ultraviolet cameras, radio imaging cameras, microwave imaging cameras, multispectral or x-ray imaging cameras. Cameras may include ordinary lenses, fish-eye lenses, or other types of specialized convex or concave lenses. Cameras may optionally be arranged so that a wider view angle may be stitched together from multiple camera feeds, such as a 360 degree circular view, a X-Y-Z complete spherical view, or some subset of either one of those. Cameras may optionally include analog and/or digital stabilization over one, two, or three dimensions. Other data from other sensors, such as radar or sonar sensors, may also be stitched in a 360 circular or spherical view or some subset thereof, and may be combined with camera data stitched in this way. The cameras may be video cameras or still image cameras.

Other non-camera sensors may also include stabilization units when applicable, such as for laser rangefinders, radar sensors, or sonar sensors. The sensors' data may go directly to local storage 540 in the UAV 100 and/or local storage 590 in the base module 105 and/or external storage 595, and may also include a buffer so that the data may be streamed elsewhere (e.g., at the manager device 600). The sensor module may also include components configured for multiple object retrieval or capture, collection such as robotic collections arms, bags, automatic hooks, sprayers, recoiling rope/wire systems, probes, baskets, nets, fluid sampling tubes, air samples, radiological and nuclear detection sampling, magnets, merchandise, medicine, documents, goods, service capacity or electromagnets.

The UAV 100 may include a communications transceiver 530 as described in relation to FIG. 1A. Additionally, some UAVs 100 may communicate with other UAVs 100, either as an end destination to a communication or as a "hop" along to communicating with another device such as the base module 105 or manager device 600. In some cases, UAVs 100 can fly in multiple pairs, with a first UAV 100 transmitting data and a second UAV 100 receiving the data from the first UAV 100 in order to increase or decrease the radio frequency (RF) signal baseline from the transmitted and returned signal and operate beyond visual line of sight range and over the curvature of the earth where VHF/UHF RF signals are limited.

The UAV 100 may include a flight mechanism 535. This may include one or more rotors, one or more wings, one or more thrusters, gas airbag, one or more glider/sail components, one or more parachutes, or some combination thereof.

The UAV 100 may include a navigation module 525 to assist in guiding the UAV 100 and executing a flight plan. The navigation module 525 may include software, hardware, or some combination thereof. The navigation module 525 may interface with the sensor module in that it may obtain data from a location sensor such as a Global Positioning System (GPS), GNSS, Radio Frequency (RF) Wired, Wireless, optical lights, IR and (surveyed) ground based optical, radar remote sensors, a gyroscope sensor, an accelerometer sensor, a wind-speed sensor, or some combination thereof. The navigation module 525 may also include intelligent routing software elements, and may use computer vision techniques and onboard radar to avoid stationary and moving obstacles detected via a camera sensor, a thermal imaging sensor, a night vision sensor, a laser rangefinder, a Sound Detection And Ranging (SONAR) sensor, a Light Detection and Ranging (LIDAR) sensor, or some combination thereof. In addition a multi-frequency radar system may be used by the UAV 100 for imaging the earth surface and areas below the surface, Synthetic aperture radar (SAR) integrated simultaneously with visual still or video data on a UAV 100 platform with improved positioning performance by GPS/IMU georeferencing.

The navigation module 525 may also detect adverse weather conditions, such as rain, ice, sleet, hail, snow, or fog, that might make it difficult or impossible for the UAV 100 to fly properly. The navigation module may also detect adverse defensive conditions, such bullets flying nearby, airframe icing, nearby flames, nearby explosions, or falling rubble, which may be detected via microphones, onboard radar, cameras, or thermal imaging, thereby protecting the UAV 100 from threats that might destroy or damage the UAV 100. Such adverse conditions, if detected by the navigation module, can trigger a re-routing function to either avoid the adverse conditions or return to the base module 105. The navigation module of the UAV 100 may receive remote-control pilot input (e.g. including line-of-sight flying or beyond-line-of-sight camera-based flying) and/or include an autonomous flight or "autopilot" function (e.g., which may be entirely beyond line of sight).

The UAV 100 may include a UAV 100 central controller 515 that executes and manages the other components, such as the power management module, the sensor module, the navigation module, the communications transceiver 145, and the local storage, and ensures that any flight plans or objectives received by the UAV 100 or generated by the UAV 100 are executed. The UAV 100 central controller may be a computing system 900 as described in FIG. 9.

The UAV 100 may include a local storage 540, which may include one or more memory storage systems such as the mass storage device 930 and/or portable storage medium drive(s) 940 of FIG. 9.

The base module 105 includes various elements 550 as well.

The base module 105 includes a power transfer module 110. The process of "recharging" a UAV 100 may include recharging a battery of the UAV 100 with electric current, replacing a battery 545 of the UAV 100 with a fresh/charged replacement battery 130, refilling a fuel tank of the UAV 100, or compressing air/fluid in an air/fluid tank of the UAV 100.

The base module 105 may include an energy port/cable that couples the base module 105 to a power source 555, such as an electrical wall socket power outlet connected to an electrical grid, a power generator (e.g., operating on fuel, solar power, wind power, compressed air power, hydroelectric power, nuclear power, or mechanical power), a capacitor, or a battery. In some cases, the base module 105 may contain the power source 555 itself, such as a power generator. The base module 105 may alternately or additionally include a power storage system 555 of its own to help operate the power transfer module 110, which may include rechargeable or replaceable batteries, a fuel tank, a chemical power storage system, a nuclear power system, or a mechanical power storage system such as one that uses compressed air/fluid energy storage.

The base module 105 may include a communications transceiver 145 as described in relation to FIG. 1A.

The base module 105 may include a local storage, which may include one or more memory storage systems such as the mass storage device 930 and/or portable storage medium drive(s) 940 of FIG. 9. The local memory may also be communicatively coupled (e.g. via a physical connection or a network connection through the communications transceiver 145) to an external memory.

The base module 105 may include a navigation module 570, which may aid in preparing a flight plan for the UAV 100. In order to do this, the navigation module 570 may obtain navigation, mapping, terrain, or weather data from the Internet, from another device accessible through a network 620, or from local storage 590 (e.g., previously downloaded data or data generated by sensors coupled to the base module 105 or one or more associated UAVs 100). The base module 105 may provide the UAV 100 with navigation updates during storage or during a flight. Navigation updates may include changes to the flight plan, changes to airspace, restricted airspace areas, Temporary Flight Restrictions (TFRs), restricted flight areas, stormy areas or other areas to avoid, other safety of flight issues such as other aerial traffic conflicts or map data. The base module 105 may also aid the UAV 100 in generating a flight plan to complete an objective (e.g., surveillance, security, defense, sensor data retrieval at a given location, or object retrieval). The UAV 100 operations center, base station, and user controls will be supplied via UAV 100, a real time air picture (displayed), generated either by onboard UAV 100 camera or synthetic vision (from actual flight data or digital synthetic product pre loaded) of the operational area available to the user of what is seen by the UAV 100 in real time. The function will also show heading, altitude, attitude, airspeed, vertical speed, navigation aids, terrain features, terrain elevation segment colors for the flight in process, UAV symbol overlaid on map showing flight progress, radar picture, Traffic Targets, obstacles such as towers, radio navigational aids, power management, battery level, directional compass with overlay of flight plan route of flight path with clock.

The base module 105 may include a base module 105 central controller 565 that executes and manages the other components, such as the power transfer module 110, the navigation module 570, the communications transceiver 145, and the local storage 590, and ensures that any UAV(s) 100 associated with the base module 105 are recharged enough to execute a flight plan, have enough information to execute a flight plan, alternate if required, and successfully return data to the manager device 600 and/or network system.

The base module 105 and/or UAV 100 may in some cases retrieve data from, or transmit to, an external storage 595. The external storage 595 may be a local storage, such as an external hard drive or flash drive that is manually connected to the base module 105 or UAV 100. The external storage 595 may alternately be remote storage, such as storage at the network system(s) 620 illustrated in FIG. 6C or FIG. 6D.

Figure 6A:
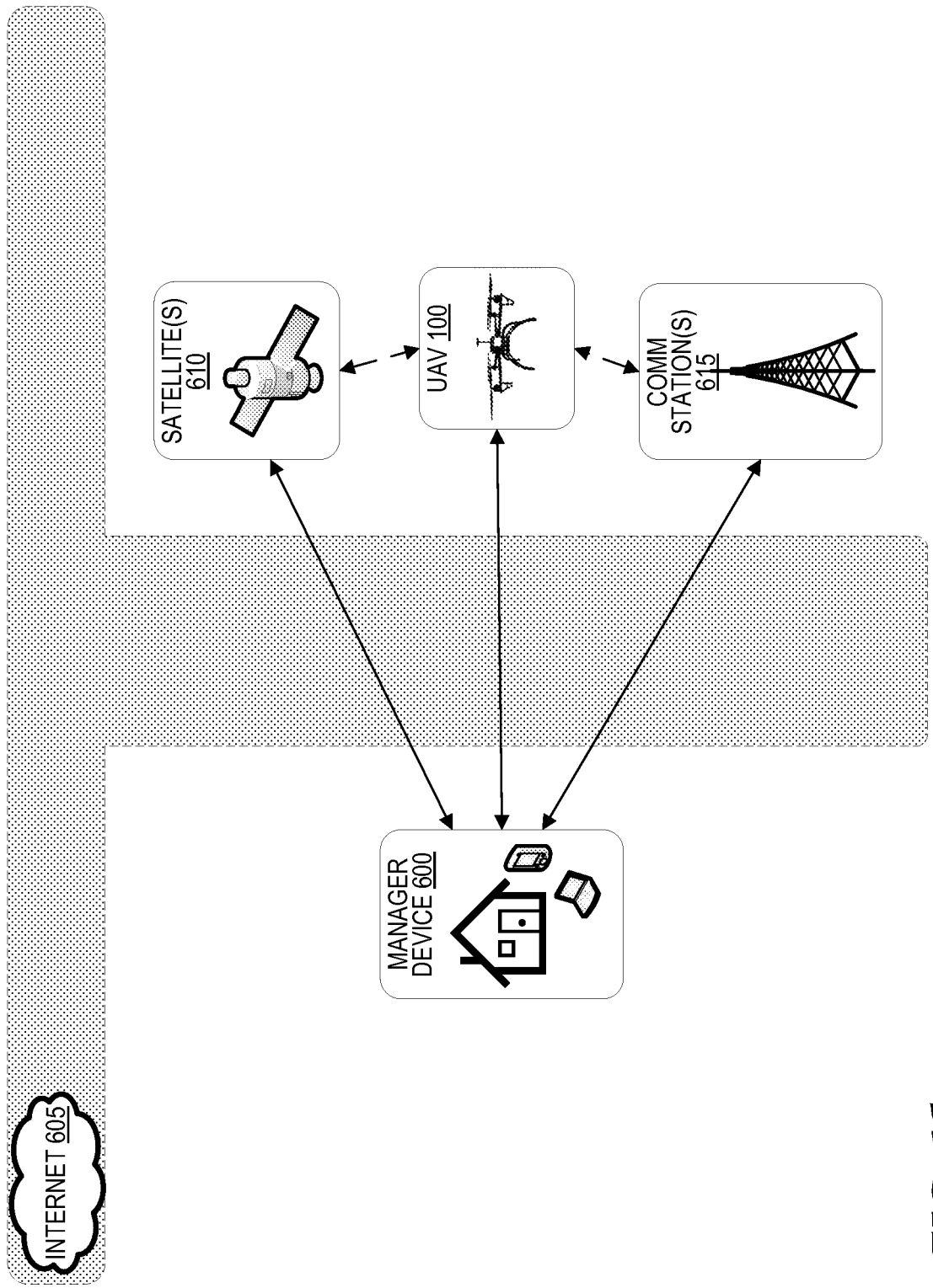
FIG. 6A illustrates an exemplary communication ecosystem allowing direct communication between a manager device and an unmanned aerial vehicle.

FIG. 6A illustrates an exemplary communication ecosystem allowing direct communication between a manager device 600 and an unmanned aerial vehicle 100.

The manager device 600 may be any type of device, such as a computing device 900 as described in FIG. 9, or may in some cases be a collection of computing devices (which may include some combination of physical computers and virtual machines) either networked together (e.g., using a local area network or wireless local area network) or distributed throughout the Internet. The manager device 600 may be, for example, a smartphone device, a tablet device, a laptop, a desktop, a mobile media device, smart watch, a home entertainment system, or a video game console, or some combination thereof. The manager device 600 may optionally be house in a command and control center, data fusion center, remote control facility. The manager device 600 may view various types of data (see FIG. 8) such as real time navigation data, flight data, UAV sensor data, weather data, flight characteristics, flight activity, flight conditions, wind data, airspace restrictions, synthetic vision displayed with UAV 100 location in real time.

The manager device 600 may, as depicted in FIG. 6A, communicate directly to the UAV 100 (e.g., through a Bluetooth connection if the manager device 600 is nearby, or through a Wi-Fi connection) or communicate through a connection facilitated by satellite 610 (e.g., using a satellite phone or satellite Internet) or through a connection facilitated by a communication-station 615 (e.g., using a cellular network, radio network, or radar waystation). The manager device 600 includes its own communications transceiver similar to communication transceiver 145 of the base module 105 or communication transceiver 530 of the UAV 100.

The manager device 600 may transmit a flight plan to the UAV 100, which may include a flight path, waypoints, an objective (e.g., surveillance, GPS location, an address, security, defense, sensor data retrieval at a given location, or object retrieval), or some combination thereof. The UAV 100 may then autonomously or semi-autonomously generate a flight plan to execute. The flight plan may include a mission objective, such as to deliver merchandise to a particular address with confirmation when mission is completed. The manager device 600 may receive confirmation of the execution of the flight plan and/or objective, and may receive sensor data from the sensor module 520 of the UAV 100 in a systematic, sequential manner.

Figure 6B:
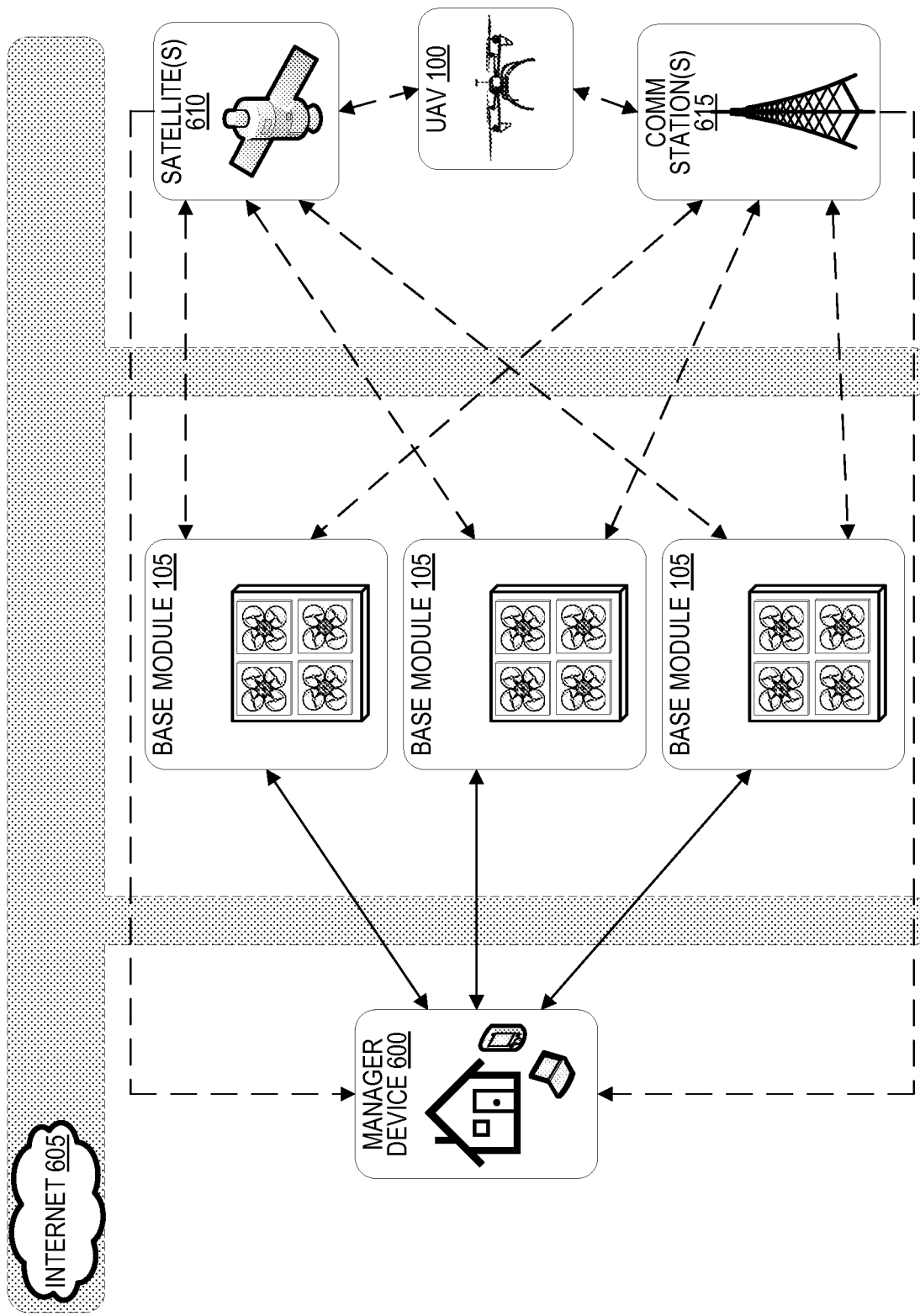
FIG. 6B illustrates an exemplary communication ecosystem allowing communication between a manager device and an unmanned aerial vehicle through one or more base modules.

FIG. 6B illustrates an exemplary communication ecosystem allowing communication between a manager device 600 and an unmanned aerial vehicle 100 through one or more base modules 105.

The base modules 105 may, in the arrangement of FIG. 6B, communicate first with one or more base modules 105, which may then communicate with the manager device 600. This may be useful in situations where the communications transceiver 530 of the UAV 100 is limited in function (e.g., only includes Bluetooth or wired data transfer capabilities) while the communications transceiver 145 of the base module 105(s) is able to communicate with the manager device 600, either through a wired/wireless connection of its own (e.g. a wired or Wi-Fi based Internet connection) or through the use of a satellite-based or communication-station—based connection (e.g., using a cellular network or radio network or radar waystation as described relative to the communications transceiver 145 described in FIG. 1A). This allows the UAV 100 to be smaller, more inexpensive, and more energy-efficient, as the base module 105 does more of the "heavy lifting" with respect to communications.

The base modules 105 may include a local memory 590 as discussed with respect to FIGURE. The local memory may also be communicatively coupled (e.g. via a physical connection or a network connection through the communications transceiver 145) to an external memory. The base module 105 may then communicate with the manager device (s) 600 in order to transmit stored sensor data from the UAV(s) 100 and/or status information regarding the UAV(s) 100 or the completion of objective(s). Secure global network access may be available to the base modules 105 if they are internet-connected via secure log on to the base modules 105.

The base modules 105 may aid the manager device 600 in preparing flight plans for one or more UAVs 100 based on specific objectives. Such flight plans may range anywhere from exact paths to checkpoints between which the UAV 100 should autonomously navigate, or one or more objectives that the UAV 100 should accomplish, and may in some cases require input from the UAV 100 to generate.

Figure 6C:
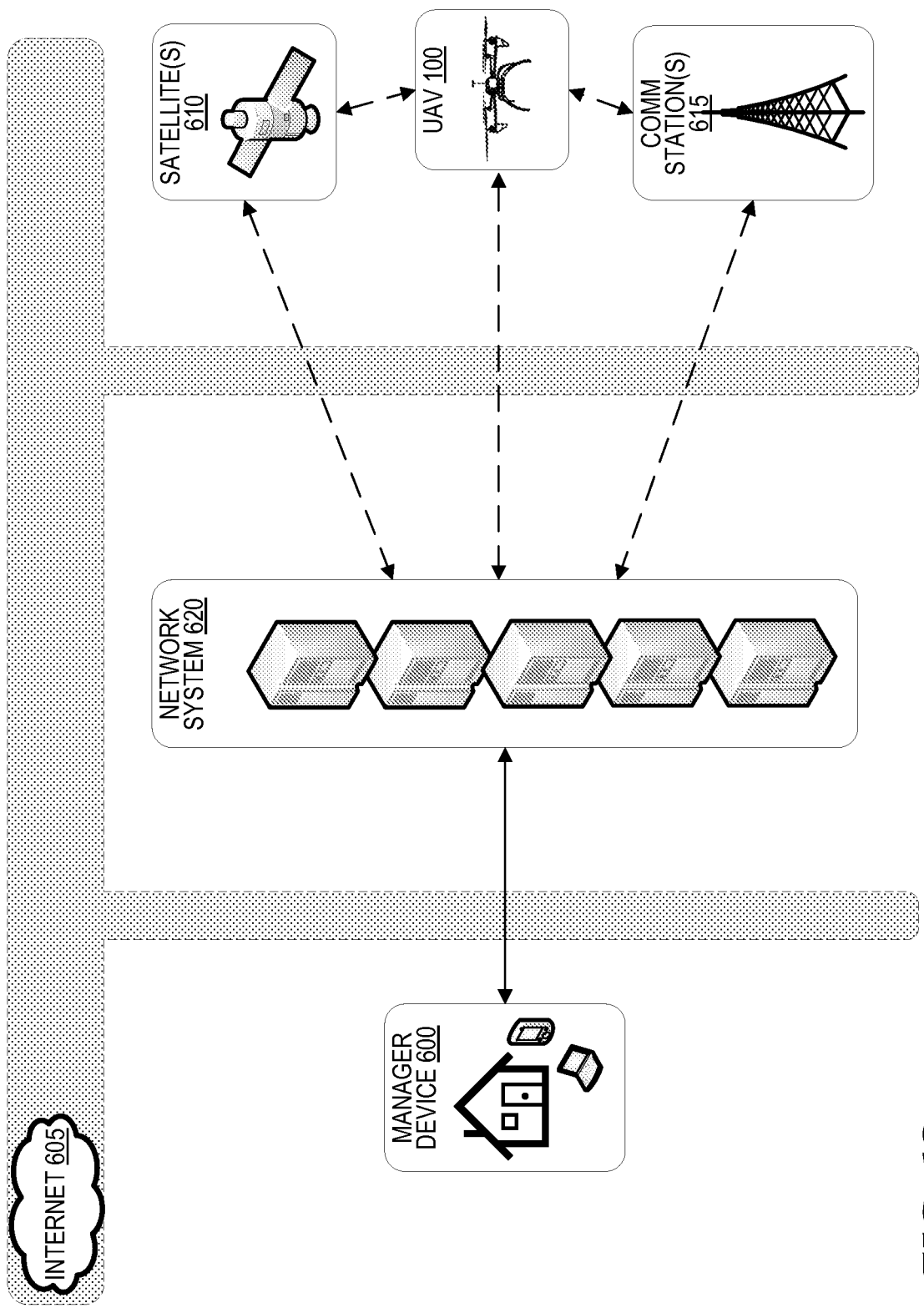
FIG. 6C illustrates an exemplary communication ecosystem allowing communication between a manager device and an unmanned aerial vehicle through a network system.

FIG. 6C illustrates an exemplary communication ecosystem allowing communication between a manager device 600 and an unmanned aerial vehicle 100 through a network system.

The network system 620 may include one or more computer systems, which each may be any type of computer system 900 as described in FIG. 9. The network system 620 may include any combination of physical computers and virtual machines. The computers systems of the network system 620 may be networked together (e.g., using a local area network or wireless local area network) or distributed throughout the Internet. The network system 620 may include an interface, which may include a personalized section for the manager device(s) 600 (e.g., via a secure user account) and may store data in a network storage, which may include one or more storage systems similar to storage system 930 of FIG. 9. The network storage may be set up with redundancy in mind, such as in a redundant array of independent disks (RAID) system. The network system 620 may then be accessed by the manager device(s) 600 in order to retrieve stored sensor data from the UAV(s) 100 and/or status information regarding the UAV(s) 100 (e.g., health/damage status of each UAV) or the completion of objective (s).

The network system 620 may aid the manager device 600 in preparing flight plans for one or more UAVs 100 based on specific objectives. Such flight plans may range anywhere from exact paths to checkpoints between which the UAV 100 should autonomously navigate, or one or more objectives that the UAV 100 should accomplish, and may in some cases require input from the UAV 100 to generate.

The network system 620 and/or base modules 105 may include various tools and store various data, such as any of the types of UAV 100 information 810 illustrated in FIG. 8, any of the types of UAV 100 Status 820 as illustrated in FIG. 8, at least a subset of a UAV 100 mission log 820 as illustrated in FIG. 8, login/account tools, an image of a UAV 100, images of any identifying markings or decals on the UAV 100, (e.g. UAV 100 model, UAV 100 identifiers for specific UAVs 100, onboard sensor identification certified and non certified image and 3D geolocation data output types fully integrated to UAV 100 GPS/INS/Orientation/Positional data), UAV 100 maintenance information (e.g., airworthiness certificate, flight schedule, pilot logs), flight plan logs, mission logs, mission objective logs, sensor logs, current airspace operational areas, weather, restrictions, current obstacle data, stored sensor data management (e.g., viewing and editing images, video, sound, layers, change detection, annotations), navigation data (e.g., maps, architectural data, UAV-detected obstructions or adverse conditions, previous flight plan data), customer/user information, mapping tools (e.g., with layers and overlays and zoom measurements). The network system 620 and/or base modules 105 may also provide certified sensor data in streaming format.

The network system 620 may be used to manage a set of UAVs 100 and base modules 105 located globally around the world from a single manager device 600 or set of manager devices 600 (e.g., a set of manager devices 600 located at an organization headquarters).

Secure global cloud access may be available to the base modules 105 and network system 620 via secure log on to the system.

Figure 6D:
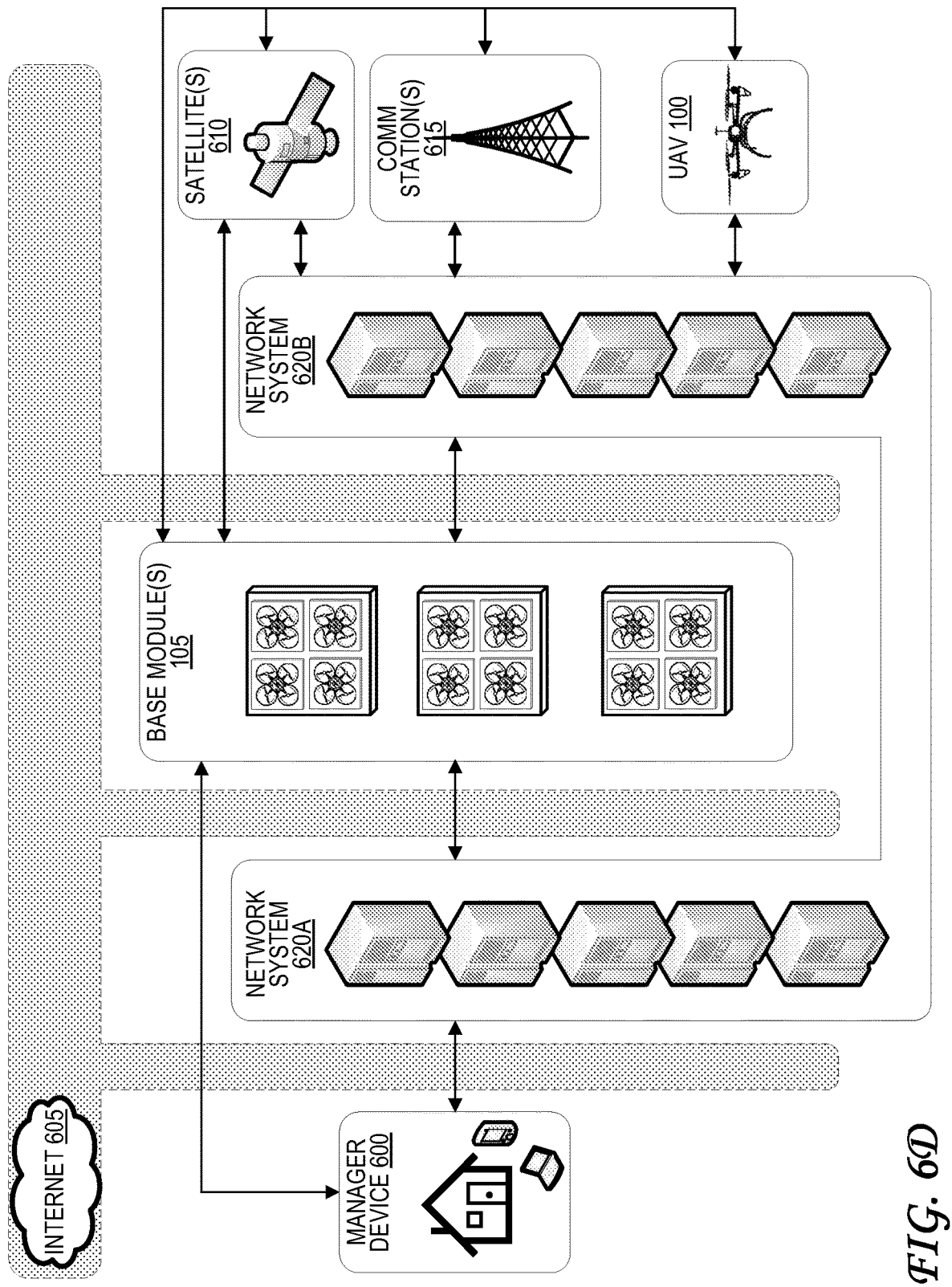
FIG. 6D illustrates an exemplary communication ecosystem allowing communication between a manager device and an unmanned aerial vehicle through a combination of a network system and one or more base modules.

FIG. 6D illustrates an exemplary communication ecosystem allowing communication between a manager device 600 and an unmanned aerial vehicle 100 through a combination of a network system 620 and one or more base modules 105. As illustrated in FIG. 6D, information may travel through the network system 620 before it reaches a base module 105, after it reaches a base module 105, or both.

Figure 7:
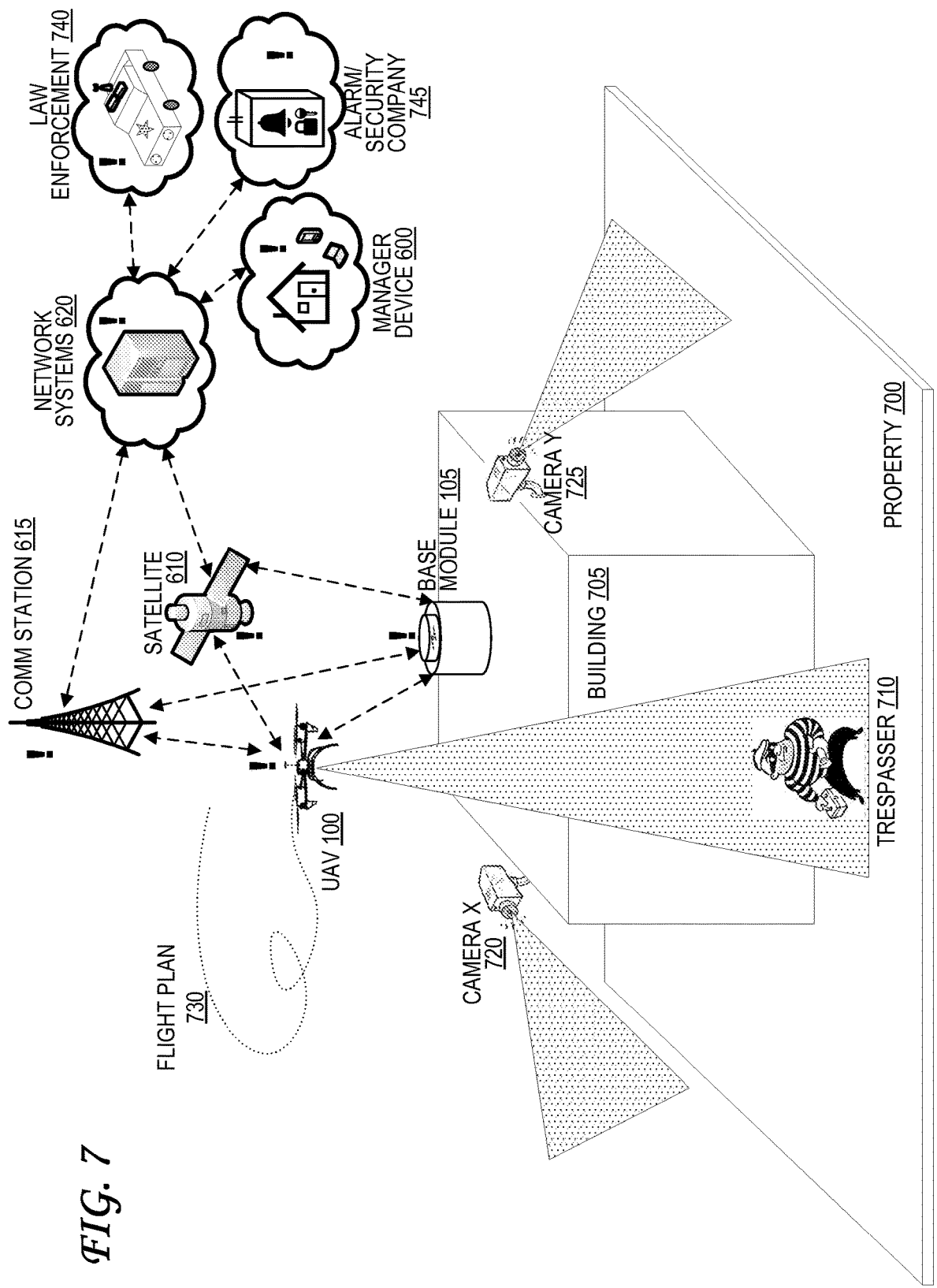
FIG. 7 illustrates a property security system using an unmanned aerial vehicle in addition to other security devices.

FIG. 7 illustrates a property security system using an unmanned aerial vehicle 100 in addition to other security devices. The property security system of FIG. 7 is used to protect building 705 and property 700.

The property security system of FIG. 7 is one exemplary objective that can be given to one or more UAVs 100 by a manager device 600. FIG. 7 illustrates a UAV 100 completing a flight plan 730 generated by the UAV 100, by a base module 105, by a network system 620, by a manager device 600, or by some combination thereof. The objective of flight plan 730 is security surveillance of a building 705 and its property 700.

The UAV 100 is used in tandem with an existing non-UAV-based security system that includes camera X 720 and camera Y 725. Cones are illustrated indicating lines of sight of camera X 720, camera Y 725, and a camera of the UAV 100, which is currently in a blind spot that camera X 720 and camera Y 725 cannot see (e.g., the objective given to the UAV 100 may have been to cover the blind spots of the non-UAV 100 security system of FIG. 7). The line of sight of the camera of the UAV 100 indicates that it has identified a trespasser 710. The UAV 100 then communicates an alert as described in FIG. 6A, FIG. 6B, FIG. 6C, or FIG. 6D. That is, the UAV 100 communicates its alert through the base module 105, which communicates it to the network system 620. The network system 620 then notifies the manager device 600, law enforcement 740 (e.g., police, FBI, the fire department, ambulance), an alarm/security company 745, or some combination thereof. The UAV 100 may also contact the network systems 620 directly without the base module 105's help. In some cases, the UAV 100 and/or base module 105 may contact the manager device 600, law enforcement 740, or alarm/security company 745 independently without the network systems 620. The UAV 100 and/or base module 105 may use satellites 610 or communications stations 615 as communication aids. In some cases, a UAV 100, base device, or network system 620 may be authorized by the manager device 600 to grant UAV 100 sensor data to another third party, such as a court, a government agency, an insurance company, or an advertiser.

Alternately, the UAV 100 of FIG. 7 may be flown out in reaction to an alarm from another security system (e.g., a camera, a thermal camera, a motion detector, a laser tripwire, a sonar or radar sensor). In particular, when an alarm system senses an intrusion, a "launch trigger" signal may be sent to instantly to launch the UAV 100 (e.g., the "launch trigger" signal may be sent to the network systems 620, to the manager device 600, to the base modules 105, to the UAV 100 itself, or some combination thereof). The UAV 100 may then launch in response to receiving the "launch trigger" signal or a signal based off of the "launch trigger" signal. The UAV 100 operates in an orbit over the property providing a superior umbrella view of the property. The UAV 100 may be configured to locate and chase a trespasser, for example, or photograph a trespasser, capture a trespasser with a net, or even attack a trespasser with a weapon (e.g., for military applications).

While the objective given to the UAV 100 in FIG. 7 is security surveillance, the UAV 100, through the ecosystem described in FIG. 6D, may be used for various purposes by various parties. For example, the UAV 100 could be used to spot and help put out fires by a fire department, to deliver packages for a commercial entity, to assist with security/defense operations by police/SWAT/military operators or contractors, first-responders in an emergency, to survey property (e.g., elevation mapping) for flood insurance policy requirements or real estate purposes (e.g. flood insurance mapping or scanning for underground deposits or hazards), to videotape events for sports and entertainment providers, to survey property and detect metals/minerals/oil for mining purposes, to perform safety checks (e.g., detecting leaks, oil or chemical spills, completing maintenance of wind farm wind generators, fires or short circuits) for oil refineries, oil platform inspections or engineering operations, to survey traffic for a news organization or a trucker on a long trip, or to perform various photo/video functions for recreational or real estate sales promotional purposes (e.g., family photos from otherwise impossible angles).

FIG. 8 illustrates an exemplary user interface identifying an unmanned aerial vehicle 100. The user interface may be provided to the manager device 600 through the network system, through a base device 105, or some combination thereof. The user interface identifies UAV information 810 about the UAV 100, a current status 820 of the UAV 100, and includes a mission log 830 identifying two missions.

FIG. 9 illustrates an exemplary computing/controller system 900, that may be used to implement at least part of an embodiment of the present invention. For example, the computing/controller system may be a representation of the UAV central controller/processor 515, the base module central controller/processor 565, the Manager device 600. The controller system 900 of FIG. 9 includes one or more processors 910 and memory 910. Main memory 910 stores, in part, instructions and data for execution by processor 910. Main memory 910 can store the executable code when in operation. The system 900 of FIG. 9 further includes a mass storage device 930, portable storage medium drive(s) 940, output devices 950, user input devices 960, a graphics display 970, and peripheral devices 980, and a Data & Control I/O Interface 995.

The components shown in FIG. 9 are depicted as being connected via a single bus 990. However, the components may be connected through one or more data transport means.

For example, processor unit 910 and main memory 920 may be connected via a local microprocessor bus, cloud facility/data center, target internet site and the mass storage device 930, peripheral device(s) 980, portable storage device 940, and display system 970 may be connected via one or more input/output (I/O) buses either internally to the controller or external via Data & Control I/O Interface 995

Mass storage device 930, which may be implemented with a magnetic disk drive, an optical disk drive, or a solid state drive (SSD) is a non-volatile storage device for storing data and instructions for use by processor unit 910. Mass storage device 930 can store the system software for implementing embodiments of the present invention for purposes of loading that software into main memory 910.

Portable storage device 940 operates in conjunction with a portable non-volatile storage medium, such as a floppy disk, solid state memory, compact disk or Digital video disc, to input and output data and code to and from the controller system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, fingerprint such as a physical keyboard or touchscreen-simulated keyboard, for inputting alpha-numeric and other information, or a pointing device, such as a mouse, a trackball, stylus, a touchpad, a touchscreen, a microphone utilizing speech recognition technology, or cursor direction keys. Additionally, the system 900 as shown in FIG. 9 includes output devices 950. Examples of suitable output devices include speakers, printers, network interfaces, and monitors.

Display system 970 may include a liquid crystal display (LCD), Plasma, LED, OLED, CRT or other suitable display device. Display system 970 receives textual and graphical information, and processes the information for output to the display device.

Peripherals 980 may include any type of computer support device to add additional functionality to the computer system. For example, peripheral device(s) 980 may include a modem/router, or a radio data link, for example.

The components contained in the controller system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The controller can also include different bus configurations, networked platforms, multi-processor platforms, etc. Various operating systems can be used including Unix, Linux, Windows, Macintosh OS, Palm OS, iOS, Android, and other suitable operating systems.

Figure 10:
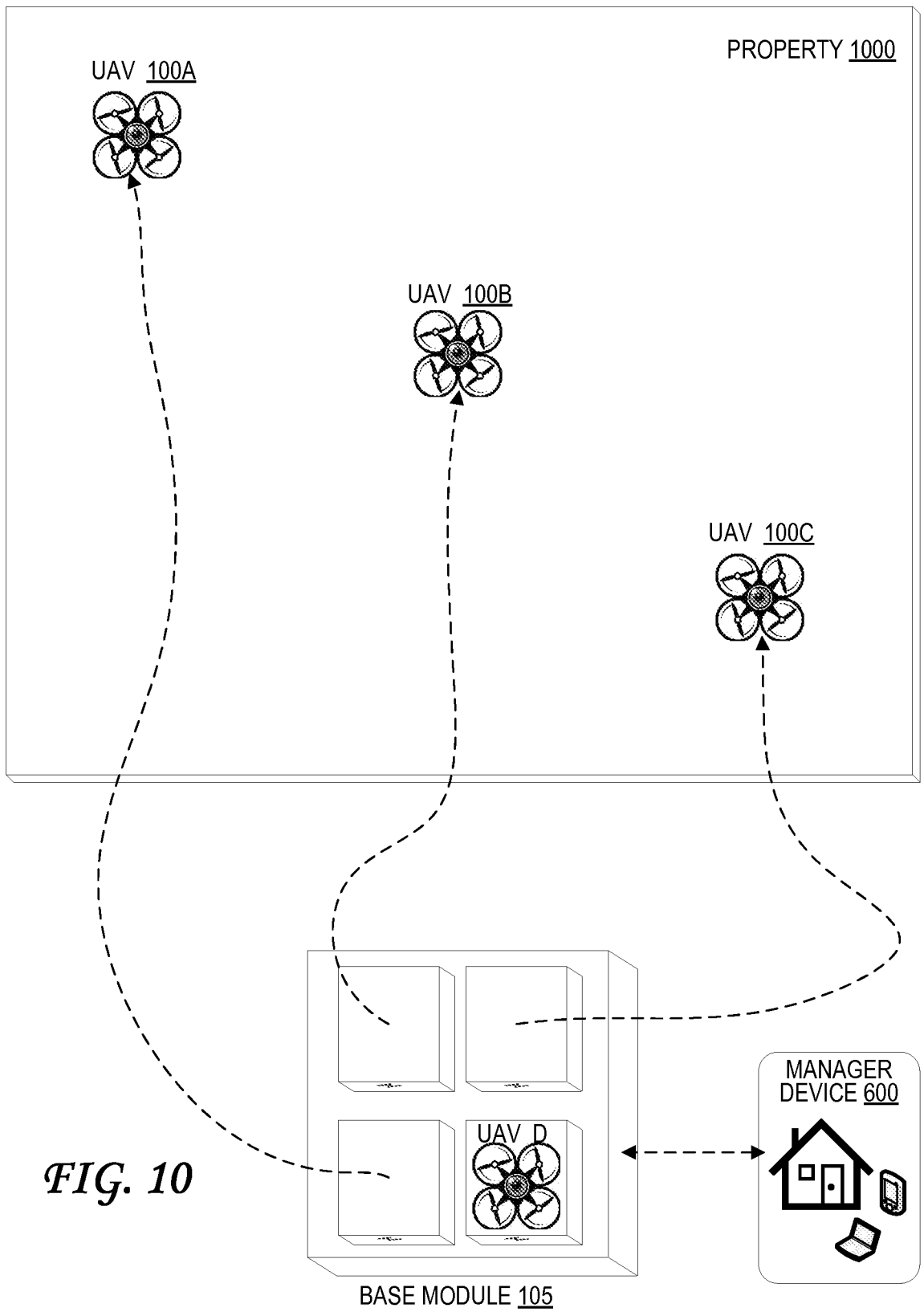
FIG. 10 illustrates an exemplary mission in which three unmanned aerial vehicle are flown from a single base module.

FIG. 10 illustrates an exemplary mission in which three unmanned aerial vehicles 100 are flown from a single base module 105. In particular, FIG. 10 illustrates UAV 100A, UAV 100B, and UAV 100C being flown over a property 1000 simultaneously in formation all communicating with each other for mission requirements, spacing and conflict avoidance.

The single mission using multiple UAVs 100 illustrated in FIG. 10 may be accomplished in a number of ways. For example, all three UAVs 100 may be given the same mission or objective. For example, if the mission or objective is to locate a particular target object or person located somewhere on the property, all three UAVs 100 of FIG. 10 may be given this objective, and could communicate with each other and/or with the base module 105 so that they may intelligently cover different areas of the property in order to locate the target object or person.

The three UAVs 100 of FIG. 10 could alternately each be given a "sub-mission" or "sub-objective" by the base module 105 or by the manager device 600. For example, if an overall mission or objective is to generate a topographical map of the property of FIG. 10, this may be accomplished by giving UAV 100A the "sub-mission" to generate a map of a first third of the property, giving UAV 100B the "sub-mission" to generate a map of a second third of the property, and giving UAV 100C the "sub-mission" to generate a map or elevation of a last third of the property. Such pre-division of a mission into sub-missions could also be useful if the overall mission is to detect fires or leaks or other hazards that may or may not be present on a property. Such pre-division of a mission into sub-missions could also be useful if the overall mission is to take photographs or videos of a target person or object in different spectrums (e.g., visible, thermal, ultraviolet) and/or from different angles (e.g., overhead, side view, perspective view, north-facing, south-facing, east-facing, west-facing, object-tracking), and each UAV 100 is assigned a "sub-mission" of taking photos in a particular spectrum and/or from a particular angle.

It may be useful to conduct a single mission using multiple UAVs 100 as illustrated in FIG. 10 for various reasons. For example, missions and objectives may be accomplished more quickly the work is divided between multiple UAVs 100 (e.g., multiple UAVs 100 may generate a terrain map of an entire property more quickly if three UAVs 100 are mapping simultaneously). Further, a mission/objective may be accomplished with more accuracy and precision if the work is assigned to multiple UAVs 100. For example, if multiple UAVs 100 are assigned to take photos of a meeting between two target individuals, more photos will be received from more angles, which may increase the likelihood of receiving high-quality photos (e.g. photos in which the faces of the target individuals are clearly visible) and various composite image technologies can be used to increase the accuracy and precision of photos (e.g., creating a sharper image or stereo image of the target meeting by compositing images of different exposures and zoom values, or creating a three-dimensional image of the target meeting by compositing images from various angles), Finally, a mission or objective may be accomplished more efficiently. For example, if the mission is to take one thousand photos of a target object or person, this may be accomplished relatively quickly by 3 UAVs 100 but may take longer if assigned to one UAV 100. This may be particularly important because if a mission is inefficient, then by the time the UAV 100 finishes its mission, the target may have moved out of sight, or the UAV 100 may start running out of power.

The operations undertaken by UAV 100A, UAV 100B, and UAV 100C of FIG. 10 may also include transportation of packages 1350 as illustrated further in FIG. 13 or collecting samples 1210 as illustrated in FIG. 12. The implementation of FIG. 10 thus may allow for simultaneous deliveries of packages 1350 or simultaneous gathering to samples 1210, which may be important for scientific research or surveying. The UAVs 100 of FIG. 10 may also be used to collect and retransmit live broadcast TV or radio of weather, news, events, surveillance, catastrophic storm damage recovery, and support rescue missions.

Flight data, such as images, GPS locations, and flight times may be certified by the network systems 620 as accurate and/or as originating from a particular UAV 100.

Figure 11:
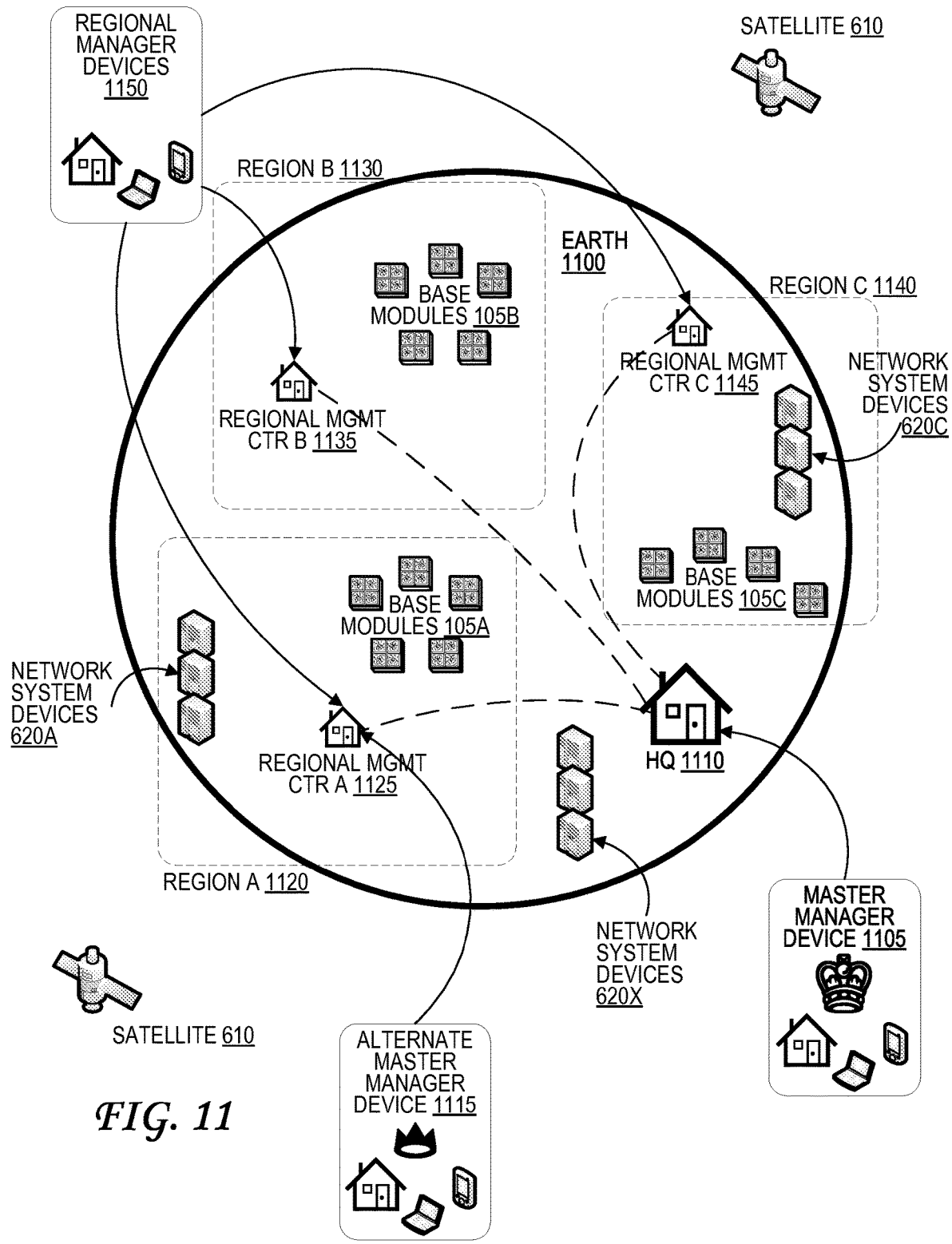
FIG. 11 illustrates a planetwide ecosystem with a master manager device and multiple regional manager devices.

FIG. 11 illustrates a planetwide ecosystem with a master manager device 600 and multiple regional manager devices 600.

The planetwide ecosystem of FIG. 11 is illustrated on a simulated globe of the Earth 1100 and illustrates a headquarters 1110 housing at least one master manager device 1105. The planetwide ecosystem also includes a Region A 1120, governed by a regional management center A 1125 with a regional manager device 1150A; a Region B 1130, governed by a regional management center B 1135 with a regional manager device 1150B; and a Region C 1140, governed by a regional management center C 1145 with a regional manager device 1150C. The regional manager devices 1150 can, for example, issue missions and objectives to the UAVs 100 in the region, which are stored (while not flying) at the base devices in the region. The regional manager device 1150A has also been assigned to be the alternate master manager device 1115 that may take over the duties and control capabilities of the master manager device 1105 the master manager device 1105 is out of range, is missing, or is damaged.

Each region includes multiple base modules 105, each potentially storing multiple UAVs 100. For example, region A 1120 includes base modules 105A, region B 1130 includes base modules 105B, and region C 1140 includes base modules 105C.

The planetwide ecosystem of FIG. 11 also illustrates network system devices 620, which make up the network system 620. The network system 620 devices may be distributed globally (in clusters or not) to help prevent network system 620 downtime in the event that a region is affected by an issue that would cause problems with network system 620 devices (e.g., a natural disaster affecting a regional power grid). For example, region A 1120 includes network system devices 620A, region B 1130 includes network system devices 620B, region C 1140 includes network system devices 620C, and network system devices 620X are located in a part of the earth 1100 not governed by a pictured region.

The planetwide ecosystem of FIG. 11 also illustrates the satellites 610 discussed in relation to FIG. 6A, FIG. 6B, FIG. 6C, FIG. 6D, and FIG. 7.

FIG. 12 illustrates an unmanned aerial vehicle 100 with a robotic arm collecting a sample to be stored in a sample holder.

The sample 1210 of FIG. 12 is stored in a tube, but may alternately be stored in a jar, a petri dish, or any other type of container. The sample holder 1230 of FIG. 12 is a tray for holding tubes, but may be any other type of container. The sample 1210 of FIG. 12 is gathered using a robotic arm 1240, but may alternately be gathered with a syringe, or pump or some combination thereof.

The sample 1210 is obtained from a sample source 1220. The sample source 1220 may be, for example, farm field soil, crops, a lake, a stream, a river, a sea, and ocean, a reservoir, a pool, a desert, a forest, a glacier, a mountain snowcap, a rooftop, air, a gas-filled area, a smoke-filled area, a fire, a haze-filled area, chemical, oil, pollution, ocean plastic, fish. The sample 1210 may contain solids, liquids, gases, or some combination thereof. For example, the sample 1210 may contain soil, vegetation, snow, or air.

The UAV 100 may supply the base module 105 with the samples 1210 upon return to the base module 105. The base module 105, which is relatively stable and may contain laboratory/assay devices, may perform chemical assays on a sample 1210 to determine its ingredients, characteristics, or quality, and may report this information back to the manager device 600 or network system 620. In some cases, a UAV 100 may include laboratory/assay devices as well, and can perform chemical assays on a sample 1210 during/after collection of the sample 1210 and optionally during flight. In these cases, the UAV 100 may report this information back to the manager device 600 or network system 620 on its own if it has appropriate communications capabilities.

The UAV 100 may also supply information about a sample 1210 to the base module 105, manager device 600, network system 620, or some combination thereof. For example, the UAV 100 may supply location data identifying a GPS location of the sample source 1220 by obtaining a location measurement from a GPS receiver onboard the UAV 100 during gathering of the sample 1210. The UAV 100 may also supply altitude data corresponding to an altitude of the sample source 1220.

The UAV 100 may obtain altitude data by landing at or near the sample source 120 and measuring altitude using an onboard altitude sensor. The UAV 100 may alternately hover over a sample source 1220, measure its hover altitude using an onboard altitude sensor, and subtract a range measured using a range-finding sensor such as a laser rangefinder, a radar sensor, or a sonar sensor. This may be useful when the sample source 1220 is a body of water, such as a lake or swimming pool. The UAV 100 may obtain altitude or from looking up the altitude of a certain GPS location in a database or other information source that correlates locations to known altitudes. If the UAV 100 supplies location data without altitude data, such an altitude lookup can be instead performed by a base module 105, network system 620, or manager device 600.

Data from the UAV 100 may in some cases also identify ingredients, characteristics, or quality of such samples 1210, as the UAV 100 may include laboratory/assay systems to perform assay experiments in while gathering samples 1210 or in flight. In this way, a UAV 100 could be tasked with performing routine checkups on chlorine levels in swimming pools, or pesticide levels in crops, or moisture levels in soil. The UAV 100 may also include a Geiger counter to identify if a sample 1210 is radioactive, or of tracking a radiation level in an area in which the UAV 100 is flying or landed.

Using a UAV 100 to collect samples 1210 may be advantageous for speed of gathering samples, the ability to gather samples simultaneously at different locations using multiple UAVs 100, and the ability to gather samples 1210 in areas that are dangerous for humans, such as radioactive areas, areas filled with hazardous gases, active volcanoes, steep cliffsides, or warzones.

FIG. 13 illustrates a package distribution ecosystem using unmanned aerial vehicles 100 for transportation of packages 1350.

The package distribution ecosystem of FIG. 13 focuses on a distribution center 1310 with multiple base modules 105 and packages 1350. UAVs 100 are used to deliver the packages 1350. For example, a UAV 100 is illustrated performing a home delivery 1325 of a package 1350 to a customer's home 1320. Another UAV 100 is illustrated performing a store stocking delivery 1335 of a package 1350 to a store 1330. Another UAV 100 is illustrated performing a shipping delivery 1345 of a package 1350 to a shipping facility 1340. Another UAV 100 is illustrated performing a transfer deliver 1380 transporting a package 1350 to another distribution center 1390.

Once at a shipping facility 1340, a package may be transported further via plane 1360, truck 1365, train 1370, or watercraft 1375. These shipping vehicles may then perform home deliveries 1325, stocking deliveries 1335, transfer deliveries 1380, or further shipping deliveries 1345. The plane 1360, truck 1365, train 1370, or watercraft 1375 may themselves use UAVs 100 for delivery by housing base modules as illustrated in FIG. 4A, FIG. 4B, FIG. 4D, or FIG. 4E.

The distribution center 1310 of FIG. 13 may be controlled by a manager device 600 that identifies deliveries to be made. The package distribution ecosystem of FIG. 13 may be combined with the planetwide ecosystem of FIG. 11, meaning that the manager device 600 of FIG. 13 may be a regional manager device 1150 or a master manager device 1105 that is also in charge of other distribution centers 1390. Though only a single manager device 600 is illustrated, it should be understood that multiple manager devices 600 may be performing this task in tandem, such as a cloud network system of manager devices 600 supporting an online store or distribution company.

The packages 1350 may include, for example, web or store purchased personal items, hardware, supplies, commercial goods, food, medicine, books, tools, parts, electronics, clothing, documents, merchandise, prescriptions, or some combination thereof.

In some cases, the UAVs 100 of FIG. 13 may deliver the packages 1350 to very specific designated locations. For example, the customer home 1320 may have one or more designated spots, such as the home's doormat, the home's driveway, or a special delivery bin/box. The UAV 100 could store coordinate and/or an image of the designated location so that the UAV 100 may find the location again via its onboard GPS receiver, computer vision analysis from camera(s) onboard the UAV 100, or some combination thereof. The UAV 100 may then drop or place the package on the spot or into the box/bin. Similarly, a store 1330 or shipping facility 1345 could also have a designated loading bay spot or delivery box/bin to receive deliveries. A designated delivery box may in some cases have a door. The door may in some cases additionally include a lock that can be unlocked by the UAV 100 as well as by the delivery recipient. For example, the UAV 100 could use a physical key and a robotic arm 1210 or other key extending and turning mechanism. The UAV 100 could also use a robotic arm 1210 to enter a combination into a keypad or keyboard. The UAV 100 could also use a digital key transmitted wirelessly using a near-field communication (NFC) protocol such as radio-frequency identification (RFID), Bluetooth, or Wi-Fi local. The UAV 100 could also use a digital key transmitted wirelessly over the Internet via a satellite 610 or communication station 615 such as a cellular tower.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method of unmanned aerial vehicle management, the method comprising:
    receiving an unmanned aerial vehicle (UAV) in a cavity within a housing of a base module, the UAV including a battery;
    robotically replacing the battery of the UAV with a replacement battery via a power transfer module at the base module after receiving the UAV in the cavity within the housing of the base module;
    transferring an objective from the base module to the UAV;
    freeing the UAV from the cavity within the housing of the base module;
    receiving data by the base module from the UAV; and
    transmitting the data from the base module to a data storage medium accessible by a manager device.

2. The method of claim 1, wherein receiving the UAV in the cavity includes:
    lowering a landing surface from a raised position to a lowered position after the UAV lands on the landing surface, wherein the landing surface is in the cavity while the landing surface is in the lowered position, wherein the UAV lands on the landing surface while the landing surface is in the raised position.

3. The method of claim 1, wherein freeing the UAV from the cavity includes:
    raising a takeoff surface from a lowered position to a raised position while the UAV is on the takeoff surface, wherein the takeoff surface is in the cavity while the takeoff surface is in the lowered position, wherein the UAV takes off of the takeoff surface while the takeoff surface is in the raised position.

4. The method of claim 1, wherein receiving the UAV in the cavity includes assisting the UAV with landing using one or more clamps, wherein freeing the UAV from the base module includes assisting the UAV with takeoff using the one or more clamps.

5. The method of claim 1, further comprising activating a sliding mechanism of the base module that slides a lid from an open position to a closed position after receiving the UAV in the cavity, wherein the lid covers the cavity while the lid is in the closed position.

6. The method of claim 1, wherein freeing the UAV from the cavity includes activating a sliding mechanism of the base module that slides a lid from a closed position to an open position, wherein the lid covers the cavity while the lid is in the closed position.

7. The method of claim 1, further comprising activating a motor of the base module that closes one or more doors of the base module from an open position to a closed position in which the one or more doors cover the cavity after receiving the UAV in the cavity.

8. The method of claim 1, wherein freeing the UAV from the cavity includes activating a motor that opens one or more doors of the base module, moving the one or more doors from a closed position in which the one or more doors cover the cavity to an open position in which the one or more doors uncover the cavity.

9. The method of claim 1, wherein the cavity protects the UAV from one or more environmental conditions of an environment in which the base module is located.

10. The method of claim 1, wherein the cavity protects the UAV from water.

11. The method of claim 1, wherein transferring the objective from the base module to the UAV includes requesting that the UAV autonomously accomplish the objective.

12. The method of claim 1, further comprising receiving the objective at the base module from the manager device.

13. The method of claim 1, further comprising loading the UAV with a package, wherein the objective includes delivering the package to a location.

14. The method of claim 1, wherein replacing the battery of the UAV with the replacement battery robotically via the power transfer module includes replacing the battery of the UAV with the replacement battery using one or more robotic arms of the power transfer module.

15. The method of claim 1, further comprising providing one or more updates from the base module to the UAV, wherein the one or more updates include one or more changes to information stored in the UAV.

16. The method of claim 1, wherein the UAV includes one or more sensors, and wherein the data is captured using the one or more sensors of the UAV.

17. The method of claim 16, wherein the one or more sensors include a camera and the data includes visual media data captured by the camera.

18. The method of claim 17, wherein the visual media data captured by the camera is certified media.

19. The method of claim 16, wherein the one or more sensors include a light detection and ranging (LIDAR) sensor and the data includes LIDAR data captured by the LIDAR sensor.

20. The method of claim 16, wherein the one or more sensors include a radio detection and ranging (RADAR) sensor and the data includes RADAR data captured by the RADAR sensor.

21. The method of claim 1, wherein receiving the data by the base module from the UAV includes receiving the data wirelessly by the base module from the UAV while the UAV is outside of the base module.

22. The method of claim 1, receiving the data by the base module from the UAV occurs in response to receiving the UAV in the cavity again after freeing the UAV from the cavity.

23. The method of claim 1, wherein the data storage medium is a network system with one or more network servers, the one or more network servers accessible by the manager device.

24. The method of claim 1, wherein the housing of the base module includes at least one wall along at least one side of the cavity.

\* \* \* \* \*